United States Patent
Lancioni et al.

(10) Patent No.: US 10,721,248 B2
(45) Date of Patent: Jul. 21, 2020

(54) METHODS, SYSTEMS AND APPARATUS TO MITIGATE STEGANOGRAPHY-BASED MALWARE ATTACKS

(71) Applicant: McAfee, LLC, Plano, TX (US)

(72) Inventors: German Lancioni, San Jose, CA (US); Sherin Mathews, Santa Clara, CA (US); Fernando Ruiz, Beaverton, OR (US); Carl Woodward, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 251 days.

(21) Appl. No.: 15/834,415

(22) Filed: Dec. 7, 2017

(65) Prior Publication Data
US 2019/0182268 A1    Jun. 13, 2019

(51) Int. Cl.
| | | |
|---|---|---|
| G06F 21/00 | (2013.01) |
| H04L 29/06 | (2006.01) |
| H04N 1/32 | (2006.01) |
| H04L 12/26 | (2006.01) |
| G06F 21/56 | (2013.01) |

(52) U.S. Cl.
CPC ........ *H04L 63/1416* (2013.01); *G06F 21/562* (2013.01); *G06F 21/568* (2013.01); *H04L 43/04* (2013.01); *H04L 63/0245* (2013.01); *H04L 63/145* (2013.01); *H04L 63/1425* (2013.01); *H04N 1/32352* (2013.01)

(58) Field of Classification Search
None
See application file for complete search history.

(56) References Cited

U.S. PATENT DOCUMENTS

| | | | | |
|---|---|---|---|---|
| 8,051,295 B2* | 11/2011 | Brunk | ............ | G06Q 20/401 |
| | | | | 382/276 |
| 8,151,117 B2* | 4/2012 | Hicks | ............ | G06F 21/57 |
| | | | | 713/187 |
| 9,215,236 B2* | 12/2015 | Kennedy | ............ | G06F 21/121 |
| 10,270,790 B1* | 4/2019 | Jackson | ............ | H04L 63/1425 |
| 2006/0176299 A1* | 8/2006 | Subbalakshmi | ...... | G06T 1/0064 |
| | | | | 345/421 |
| 2006/0206715 A1* | 9/2006 | Cowan | ............ | H04L 63/0428 |
| | | | | 713/176 |

(Continued)

OTHER PUBLICATIONS

International Searching Authority, "International Search Report and Written Opinion," mailed in connection with International Patent Application No. PCT/US2018/064057, dated Feb. 13, 2019, 12 pages.

(Continued)

*Primary Examiner* — Maung T Lwin
(74) *Attorney, Agent, or Firm* — Hanley, Flight & Zimmerman, LLC

(57) ABSTRACT

Methods, apparatus, systems and articles of manufacture to detect steganographically hidden content in a media file are disclosed. An example system includes a media classifier to determine type of a media file, and a detector to apply a detection technique to the media file. The detector selects the detection technique from a plurality of steganographically-based detection techniques based on the media file type. The system also includes a remediator to apply a remediation technique to the media file based on whether the detector detects steganographically hidden content in the media file.

20 Claims, 11 Drawing Sheets

(56) References Cited

U.S. PATENT DOCUMENTS

| | | | |
|---|---|---|---|
| 2008/0019560 A1* | 1/2008 | Rhoads | G06K 7/1417 |
| | | | 382/100 |
| 2008/0037781 A1* | 2/2008 | Kocher | G11B 20/00086 |
| | | | 380/201 |
| 2009/0013074 A1* | 1/2009 | Rice | G06F 21/552 |
| | | | 709/224 |
| 2009/0113553 A1* | 4/2009 | Myles | G06F 21/606 |
| | | | 726/26 |
| 2011/0219450 A1 | 9/2011 | McDougal et al. | |
| 2015/0026464 A1 | 1/2015 | Hanner, Sr. et al. | |
| 2015/0047037 A1 | 2/2015 | Wood | |
| 2015/0319138 A1 | 11/2015 | Yan et al. | |
| 2016/0042193 A1* | 2/2016 | Hanner, Sr. | H04L 63/0245 |
| | | | 726/26 |
| 2017/0262633 A1 | 9/2017 | Miserendino et al. | |

OTHER PUBLICATIONS

Wikipedia, "Stagefright (bug)," retrieved from "https://en.wikipedia.org/wiki/Stagefright_(bug)," last edited on Jan. 30, 2019, (4 pages).

* cited by examiner

METHODS, SYSTEMS AND APPARATUS TO MITIGATE STEGANOGRAPHY-BASED MALWARE ATTACKS

FIELD OF THE DISCLOSURE

This disclosure relates generally to steganography and more particularly to methods, systems and apparatus to mitigate steganography-based malware attacks.

BACKGROUND

Steganography-based malware attacks involve concealing malicious software code, botnet commands, leaked information, etc., in an ordinary media file (e.g., an image file, an audio file, a video file). In some instances, the malicious code directs an infected device to a website that performs a set of malicious acts on the infected device by taking advantage of a known vulnerability of the infected device. Some types of malware cause valuable information stored in a computing device to be steganographically hidden in media files that are then transmitted to a third party for exploitation. Many corporations, governmental entities and others have lost large amounts of leaked information from such attacks. Current techniques to detect steganographic-based attacks are typically performed manually after the damage caused by the attack has been detected and include applying a variety of tests to suspected carriers of the malware and visually inspecting resulting binary data.

BRIEF DESCRIPTION OF THE DRAWINGS

FIG. 5 is a block diagram of example implementations of an example image stegano detector, an example video stegano detector and an example audio stegano detector which are included in the example stegano-based detector and remediator of FIG. 1 and FIG. 2.

The figures are not to scale. Wherever possible, the same reference numbers will be used throughout the drawing(s) and accompanying written description to refer to the same or like parts.

DETAILED DESCRIPTION

The number of steganography-based malware attacks has drastically increased over the last year. Unfortunately, the frequency of these attacks are likely to continue to increase due to the nearly undetectable nature of steganographic-based attacks. The very few known techniques that successfully detect such attacks in advance are not directed at detecting steganographically hidden malware generally, but rather are directed at detecting a specific malware that is known to be steganographically hidden. Most known techniques to detect steganographically hidden malware, leaked information, etc., are performed manually after the damage caused by the attack has been detected and include applying a variety of tests to suspected carriers of the malware. Often, visual inspection of binary files is needed to identify such hidden malware, leaked information, etc. Such techniques are labor intensive, time consuming and, although helpful in mitigating future similar attacks, are usually unable to detect or prevent steganographically-based attacks from occurring in the future.

Methods, systems and apparatus to detect and remediate steganographically-based malware attacks and/or information leakage events (also referred to as data exfiltration events) are disclosed herein. (Steganography is sometimes abbreviated "stegano" in this document.) A stegano-based detection/remediation system performs real-time steganalysis on probabilistically filtered media files to detect and disrupt steganographic components of the file without compromising the integrity of the carrier file (e.g., media file) in which the hidden information is stored. In some examples, the detection/remediation system includes a media file interceptor, a file filter and classifier, a steganalysis operator, a remediator, and a post-remediation handler. The detection/remediation system assigns reputation ratings to media file handlers and/or media files based on the likelihood that such handlers and/or files are likely to be associated with steganographically-based attacks. The reputation rating information can be used when assessing whether incoming media files are to be scrutinized more or less heavily.

Figure 1:
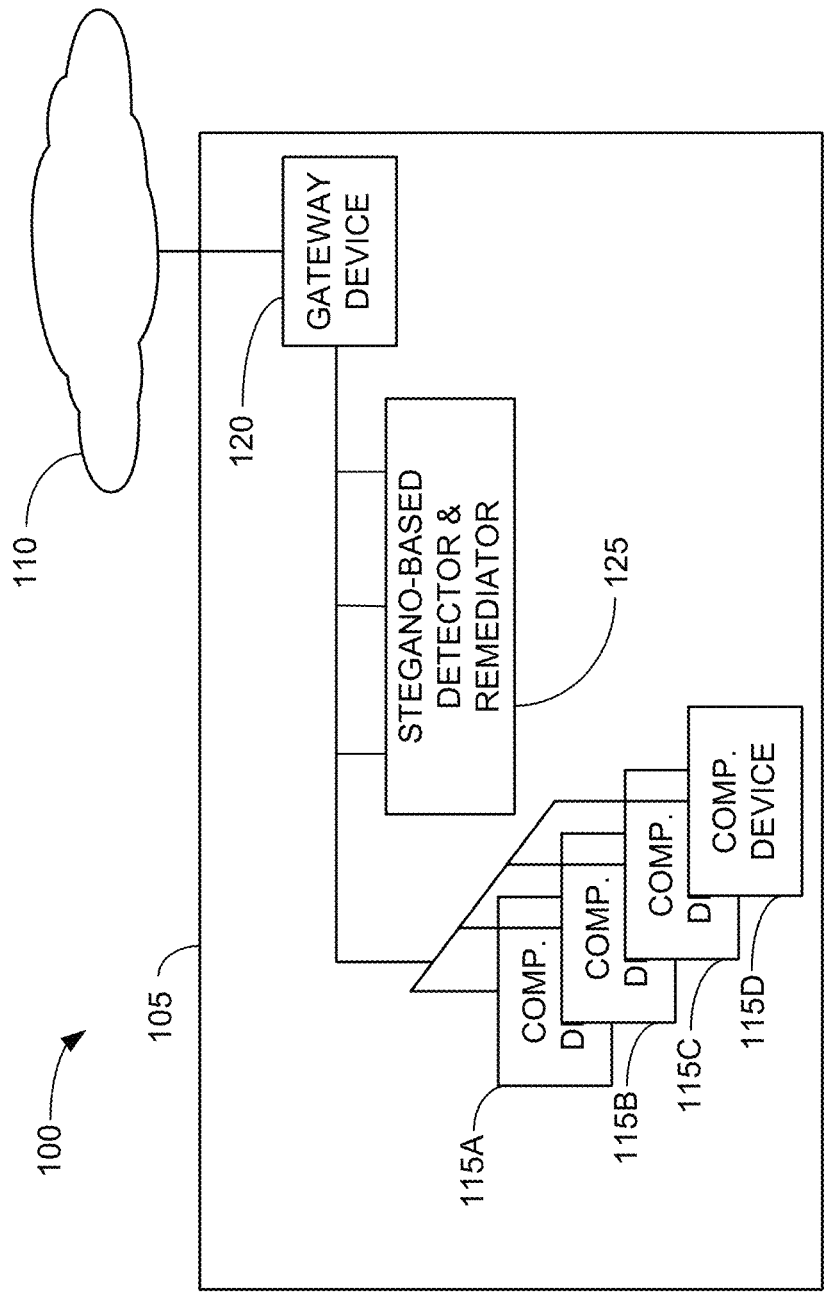
FIG. 1 is a block diagram of an example computing system having an example stegano-based detector and remediator constructed in accordance with the teachings of this disclosure.

FIG. 1 is a block diagram of an example computing system 100 installed at an example site 105 and in communication with a network such as the Internet illustrated herein as the cloud 110. The example site 105 can be housed in one or more buildings. The site 105 includes example computing devices 115A, 115B, 115C, 115D in communication with an example gateway device 120 that receives and sends information between the computing devices 115A-D and the cloud 110. Information in the form of email files, audio files, video files, image files, document files, web files (e.g., http formatted files), etc., routed through the gateway device 120 is subject to one or more operations performed by an example stegano-based detector and remediator 125. In some examples, the stegano-based remediator/detector 125 analyzes the information traveling to/from the gateway to attempt to identify files containing steganographically-hidded malware, steganograhically hidden confidential and/or proprietary information and, as needed, performs operations to disrupt such stegraphically-hidden malware and/or confident/proprietary information. In some examples, the stegano-based detector and remediator 125 also identifies files/file handlers that are suspicious and assigns reputation ratings to such files/file handlers. In some examples, the stegano-based detector and remediator 125 uses probabilistic information to determine whether a file is likely to contain steganographically hidden malware and/or information. In some examples, the probabilities are based on a type of file (audio, video, image, word processing document, etc.) being analyzed and in some examples, the type of file is used to identify a set of tests/analyses to be conducted on the file for the purpose of identifying steganographically hidden information. The stegano-based detector & remediator 125 can also base remediation techniques to be applied to one or more files on a remediation policy that specifies how files containing steganographically hidden information are to be handled. In some examples, the stegano-based detector & remediator 125 operates in conjunction with any number of other malware detectors. By analyzing, detecting and remediating files containing steganographically hidden malware and/or hidden confidential and proprietary information, the stegano-based detector & remediator 125 thwarts malware attacks and prevents confidential information leakage. Thus, unlike conventional systems that typically operate in a forensic, post-attack manner, the example stegano-based detector & remediator 125 of FIG. 1 is able to proactively monitor network traffic 250 to identify steganographically hidden malware and hidden confidential information in real time and is further able to take actions needed to disrupt such malware and prevent the exfiltration of such information on an on-going basis. Although shown external to the gateway device 120, the stegano-based detector and remediator 125 may be located internal to the gateway device 120 to analyze messages before such message are transferred to the computing device(s) 115A-115D.

Figure 2:
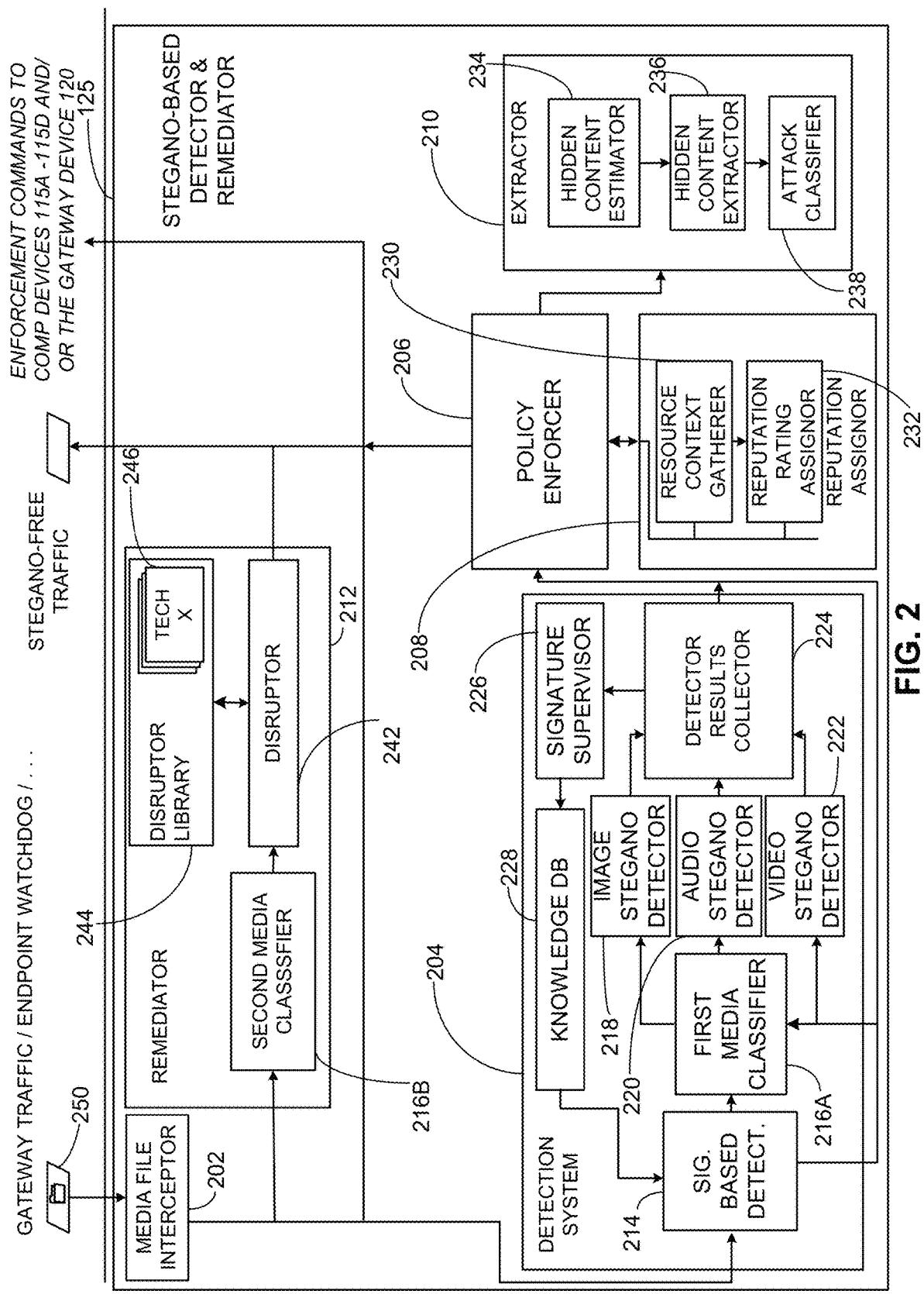
FIG. 2 is a block diagram of an example implementation of the example stegano-based detector and remediator of FIG. 1.

FIG. 2 is a block diagram of an example implementation of the example stegano-based detector and remediator 125 of FIG. 1. The stegano-based detector & remediator 125 includes an example media file interceptor 202, an example detection system 204, an example policy enforcer 206, an example reputation assignor 208, an example extractor 210, and an example remediator 212. In some examples, the detection system 204 includes an example signature-based detector 214, an example first media classifier 216A, an example image-stegano detector 218, an example audio-stegano detector 220 an example video-stegano detector 222, an example detector results determiner 224, an example signature supervisor 226 and an example knowledge database 228. In some examples, the reputation assignor 208 includes an example resource context gatherer 230 and an example reputation rating assignor 232. In some examples, the extractor 210 includes an example message estimator 234, an example message extractor 236 and an example attack classifier 238. In some examples, the remediator 212 includes an example second media classifier 216B, an example disruptor 242, and an example disruptor library 244 to store a set of disruption techniques 246.

In operation, the media file interceptor 202 accesses a flow of data traffic 250. The flow of data traffic 250 can be associated with the example gateway device 120 (see FIG. 1) such that the media file interceptor 202 is positioned to intercept any and/or all of the media files entering or leaving the site 105. In some examples, the flow of data traffic 250 is associated with an endpoint (e.g., one of the computing devices 115A-115D) such that the media file interceptor 202 is positioned to intercept any and/or all of the media files entering and leaving the endpoint. In some examples, the media file interceptor 202 examines any and/or all of the data traffic 250 and intercepts any and/or all media files (e.g., image files, audio files, video files, etc.) included in the data traffic 250. The media file interceptor 202 may be an intermediary such that it receives and forwards the data traffic (e.g., after analysis) or it can "listen in" in parallel to the data traffic 250 so as not to slow communication (e.g., not to slow communication between the gateway device 120 and one or more of the computing device(s) 115A-115D). In some examples, the media file interceptor 202 provides the intercepted media files to the example remediator 212 and to the example detection system 204.

In some examples, the example signature based detector 214 receives the media files arriving at the detection system 204. The signature-based detector 214 uses any of a variety of signature techniques to generate one or more signatures of the incoming media file. As used herein, a "signature" is defined to be an electronic identifier (e.g., a fingerprint) based on one or more inherent aspects of one or more portions of the media file and/or the signal representing the media file. A signature, thus, can be thought of as a fingerprint, preferably unique, of a media file that can be used as a proxy for the file itself in various activities such as matching or identification operations. A signature is preferably unique to the media file (or portions of the media file) it represents. A signature ordinarily corresponds to a small portion of a media file. Thus, a media file may have multiple signatures. The signature-based detector 214 compares the generated signatures to one or more stored signatures contained in the knowledge database 228. The stored signatures are signatures of media files known to contain steganographically hidden information. When the signature-based detector 214 determines that one of the generated signatures, matches one of the stored signatures in the knowledge database 228, the signature-based detector 214 transmits the file to the example policy enforcer 206. The policy enforcer 206 applies a remediation policy corresponding to the media file in the manner described below.

Figure 3:
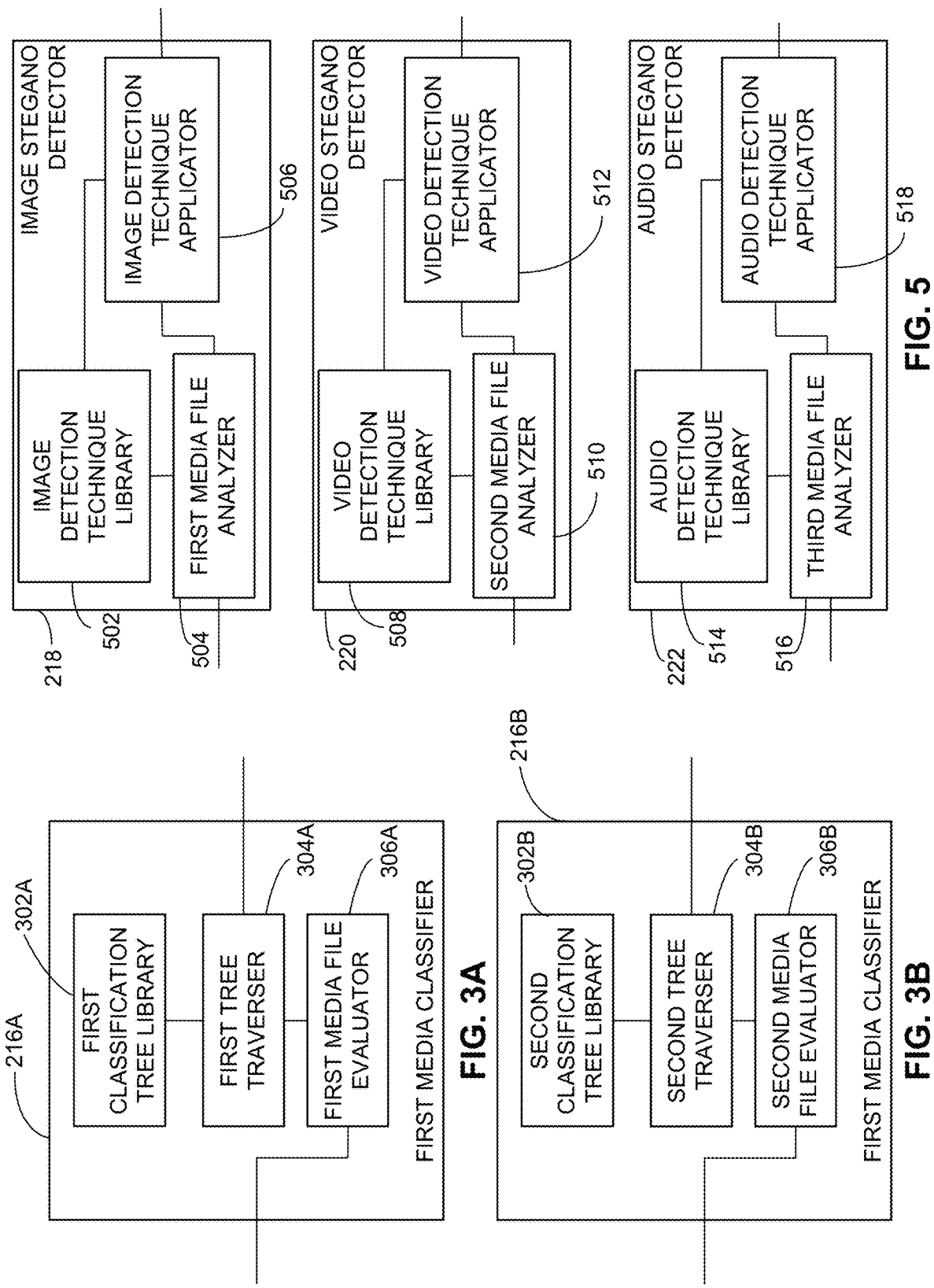
FIG. 3A is a block diagram of an example implementation of an example first media classifier which is included in the example stegano-based detector and remediator of FIG. 1 and FIG. 2.
FIG. 3B is a block diagram of an example implementation of an example second media classifier which is included in the example stegano-based detector and remediator of FIG. 1 and FIG. 2.
Figure 4:
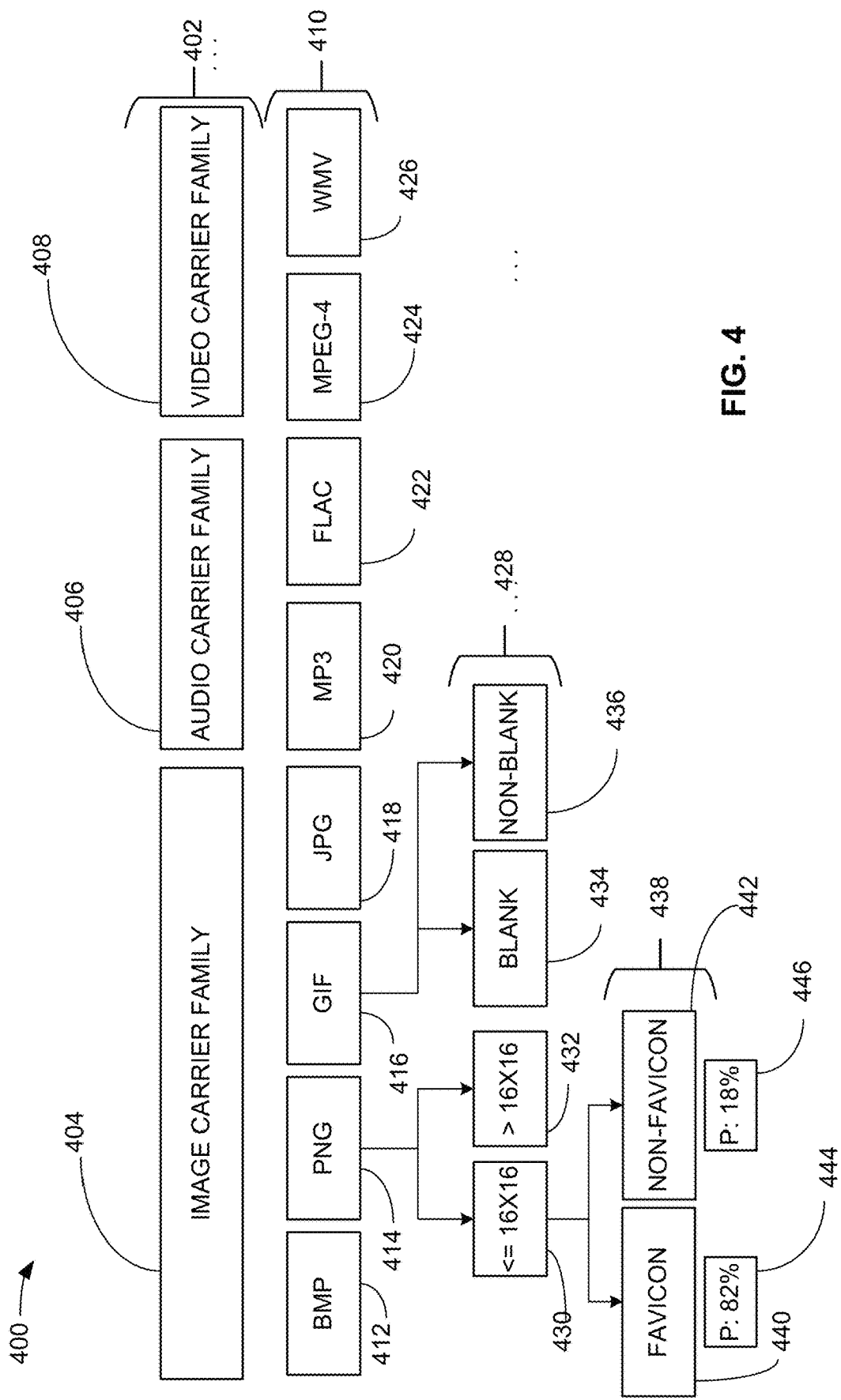
FIG. 4 is a diagram of an example media classification tree that can be accessed by the example first and second media classifiers of FIGS. 3A and 3B.

When the signature-based detector 214 is unable to locate a stored signature in the example knowledge database 228 that matches the generated signature of the media file, the signature-based detector 214 supplies the media file to the example first media classifier 216A. Referring also to FIG. 3A which is a block diagram of an example implementation of the example first media classifier 216A, the first media classifier 216A includes an example classification tree library 302A and an example tree traverser 304A. In some examples, the media file supplied by the signature-based detector 214 is received at the tree traverser 304A. The tree traverser 304A traverses the classification tree library 302A and, while traversing the classification tree library 302A, compares the contents of the media file to the information contained in the classification tree library 302A. Referring also to FIG. 4 which illustrates an example classification tree 400, in some examples, the classification tree 302A includes tiers of information about media content types. A first, top tier 402 identifies example types of media carrier families. In this example, a first media carrier family is an image carrier family 404, a second media carrier family is an audio carrier family 406, and a third media carrier family is a video carrier family 408. A second tier 410 lies below and adjacent the first, top tier 402, and identifies formats associated with the media carrier families of the top tier 402. The formats associated with the image carrier family 404 include a bitmap (BMP) format, 412, a portable network graphics (PNG) format 414, a graphics interchange (GIF) format 416, and a Joint Photographic Experts Group (JPG or JPEG) format 418. The formats associated with the audio carrier family 406 include a moving pictures experts group-3 (MP3 or MPEG-3) format 420, and a free lossless audio code (FLAC) format 422. The formats associated with the video carrier family 408 include a moving pictures experts group-4 (MPEG-4) format 424, and a Windows media video file (WMV) format 426.

The example classification tree 400 also includes an example third tier 428 that lies below and adjacent the second tier 410 and identifies characteristics associated with the media carrier formats of the second tier 410. In some examples, the third tier 428 identifies a matrix dimension characteristic associated with the PNG format 414 of the second tier 410. In some such examples, the PNG formatted files can be characterized as including a matrix 430 with dimensions that are equal to or less than "16×16" or can be characterized as including a matrix 432 with dimensions that exceed "16×16." In some examples, the third tier 428 identifies a blank/non-blank characteristic associated with the GIF format 416 of the second tier 410. In some such examples, the GIF formatted files can be characterized as blank 434 or non-blank 436. The example classification tree 400 also includes an example fourth tier 438 that lies below and adjacent the third tier 428 and identifies sub-characteristics associated with the characteristics of the third tier 428. In some examples, the PNG formatted files characterized as having a matrix with dimensions that are equal to or less than "16×16" can be sub-characterized as FAVICON 440 or NON-FAVICON 442. A file characterized as FAVICON is a file that contains one or more icons associated with a website(s)/webpage(s), whereas a NON-FAVICON file does not contain such icons. In some examples, any and/or all of the file formats, file characteristics and/or sub-characteristics is associated with a probability that identifies the likelihood that a file having the format, format and characteristics and/or format, characteristics and sub-characteristics will contain steganographically hidden malware or confidential information.

As illustrated by the classification tree 400 of FIG. 4, a file in the image carrier family 404 that is formatted as a PNG file 414, includes a matrix 430 having dimensions that are equal to or less than "16×16," and is a FAVICON file 440 has an 82% probability 444 of containing steganographically hidden information. In contrast, a file in the image carrier family 404 that is formatted as a PNG file 414, includes a matrix 430 having dimensions that are equal to or less than "16×16," and is a NON-FAVICON file 442 has an 18% probability 446 of containing steganographically hidden information. Although not shown in FIG. 4, any or all of the characteristics, sub-characteristics and file formats may be associated with a probability identifying the likelihood that steganographically hidden malware or confidential information is stored in a file having the characteristics, sub-characteristics and file formats.

Referring again to FIG. 2, in some examples, the example tree traverser 304A of the example first media classifier 216A traverses the classification tree 400 stored in the classification tree library 302A using information about the media file received from the signature-based detector 214 until a probability associated with the media file format/ characteristics and/or sub-characteristics has been identified. If the probability obtained from the classification tree 400 exceeds a threshold probability, the file is at a high risk of containing steganographically hidden malware or confidential information. Due to the high risk, the tree traverser 304A delivers the media file to one of the example image-stegano detector 218, the example audio-stegano detector 220, or the example video-stegano detector 222 where the media file is subject to testing for such steganographically hidden malware or confidential information, thereby reducing latency in message delivery. In some examples, if the probability obtained from the classification tree 400 does not exceed a threshold probability, the media file is at low risk of containing steganographically hidden malware or confidential information. As a result, the tree traverser 304A delivers the media file to the policy enforcer 206 with the identified probability information. The policy enforcer 206 recognizes, based on the probability, that the media file has been determined to be at low risk of containing steganographically hidden information and deposits the media file back into the flow of data traffic 250 to continue toward one or more computing devices 115A-115D residing within the entity 105 or to a destination 110 outside of the entity 105, depending on which direction the media file was taking upon being intercepted by the media file interceptor 202. By using the probability obtained by the tree traverser 304A to identify media files at high risk of containing steganographically hidden malware or confidential information, and then subjecting those files to further detectors while permitting the media files determined to be at low risk to continue without applying further detection techniques, the stegano-based detector and remediator 125 greatly reduces the number of media files that are to be checked for malware and/or confidential information. As a result, the stegano-based detector & remediator 125 is better able to detect files containing steganographically hidden malware or confidential information without a harmful reduction in the speed at which data traffic 250 enters or leaves the entity 105, the gateway device 120, and/or any of the computing device 115A-115D. Further, as the example stegano-based detector & remediator 125 is able to identify files that are at risk of containing steganographically hidden content, the detector and remediator 125 can also operate as a type of man-in-the-middle device. As such, the stegano-based detector & remediator 125 acts as a bystander to intercepts files, flag files that are high risk and instruct other devices (e.g., the gateway device 120) to block the flagged files from the communication flow (e.g., the flow of data traffic 250).

In some examples, when the tree traverser 304A of the first media classifier 216A determines, based on the identified probability, that the media file is at high risk of containing steganographically hidden malware or confidential information, the tree traverser 304A uses the media file format to determine whether the media file includes an image, a video and/or audio. When the media file contains an image, the first media classifier 216A delivers the media file to the image stegano detector 218. When the media file contains a video, the first media classifier 216A delivers the media file to the video stegano detector 222, when the media file contains audio, the first media classifier 216A delivers the media file to the audio stegano detector 220. In some examples, when the media file contains more than one type of media (e.g., two or more of an image, a video and audio) the media file classifier 216A delivers the media file to a corresponding first one of the image, audio and video stegano detectors 218, 220, 222, and instructs the corresponding first one of the image, audio and video stegano detectors 218, 220, 222, to deliver the media file to a corresponding second one of the image, audio and video stegano detectors 218, 220, 222, when the corresponding first image, audio and video stegano detector 218, 220, 222 is finished processing the media file. In other examples, the media file is processed in parallel by two or more of the image, audio and video stegano detectors 218, 220, 222.

FIG. 5 is a block diagram of an example implementation of the example image, audio and video stegano detectors 218, 220, 222. In some examples, the image, audio and video stegano detectors 218, 220, 222 are each configured to apply one or more techniques to detect steganographically hidden malware and/or confidential information. In some examples, the image stegano detector 218 includes an example image detection technique library 502, an example first media file analyzer 504, and an example image detection technique applicator 506. The example video stegano detector 220 includes an example video detection technique library 508, an example second media file analyzer 510 and an example video detection technique applicator 512. The example audio stegano detector 222 includes an example audio detection technique library 514, an example third media file analyzer 516 and an example audio detection technique applicator 518.

In some examples, the first media classifier 216A (see FIG. 2) determines the media file has a high probability of containing steganographically hidden content and further determines that the media file contains at least one image. In some such examples, the first media classifier 216A supplies the media file, the probability, the format, characteristic and sub-characteristic information to the image stegano detector 218. The first media file analyzer 504 of the image stegano detector 218 receives the media file, the probability and the format, characteristic and sub-characteristic information. The first media file analyzer 504 analyzes the file and the delivered information to determine one or more types of detection techniques to be applied to one or more images contained in the media file. In some examples, the first media file analyzer 504 selects the one or more types of detection techniques from the image detection technique library 502. In some examples, the first media file analyzer 504 selects the type of detection techniques from the image detection technique library based on a type of encoding that is typically used to steganographically hide information into an image having the format, characteristics and sub-characteristics identified by the first media classifier 216A. The first media file analyzer 504, upon selecting/identifying the one or more image stegano detection techniques to be used, causes the image detection technique applicator 506 to apply the selected techniques. In some examples, the image detection technique applicator 506 extracts information needed to apply the selected techniques from the audio detection technique library 502.

In some examples, the example first media classifier 216A (see FIG. 2) determines the media file has high probability of containing steganographically hidden content and further determines that the media file contains at least one video. In some such examples, the first media classifier 216A supplies the media file, the probability, the format, characteristic and sub-characteristic information to the example video stegano detector 220. The example second media file analyzer 510 of the video stegano detector 220 receives the media file, the probability and the format, characteristic and sub-characteristic information. The second media file analyzer 510 analyzes the file and the delivered information to determine one or more types of detection techniques to be applied to one or more videos contained in the media file. In some examples, the second media file analyzer 510 selects the one or more types of detection techniques from the example video detection technique library 508. In some examples, the second media file analyzer 510 selects the type of detection techniques from the video detection technique library 508 based on a type of encoding that is typically used to steganographically hide information in a video having the format, characteristics and sub-characteristics identified by the first media classifier 216A. The second media file analyzer 510, upon selecting/identifying the one or more video stegano detection techniques to be used, causes the example video detection technique applicator 512 to apply the selected techniques. In some examples, the video detection technique applicator 512 extracts information needed to apply the selected techniques from the video detection technique library 508.

In some examples, the example first media classifier 216A (see FIG. 2) determines the media file has high probability of containing steganographically hidden content and further determines that the media file contains at least one audio file. In some such examples, the first media classifier 216A supplies the media file, the probability, the format, characteristic and sub-characteristic information to the example audio stegano detector 222. The example third media file analyzer 516 of the audio stegano detector 222 receives the media file, the probability and the format, characteristic and sub-characteristic information. The third media file analyzer 516 analyzes the file and the delivered information to determine one or more types of detection techniques to be applied to one or more audio files s contained in the media file. In some examples, the third media file analyzer 516 selects the one or more types of detection techniques from the example audio detection technique library 514. In some examples, the third media file analyzer 516 selects the type of detection techniques from the audio detection technique library 514 based on a type of encoding that is typically used to steganographically hide information in an audio file having the format, characteristics and sub-characteristics identified by the first media classifier 216A. The third media file analyzer 516, upon selecting/identifying the one or more video stegano detection techniques to be used, causes the example audio detection technique applicator 518 to apply the selected techniques. In some examples, the audio detection technique applicator 518 extracts information needed to apply the selected techniques from the audio detection technique library 514.

When the media file contains only one type of media (e.g., one of an image, video or audio file), the corresponding one of the image, video and audio stegano detectors 218, 220, 222 applies detection techniques to the media file. When the media file contains more than one type of media (e.g., more than one of an image, video or audio file), the media file (or a copy thereof) is delivered to more than one of the image, video and audio stegano detectors 218, 220, 222 as needed, based on the type of media contained in the media file.

Steganography can be implemented using any number of different encoding techniques and the type of steganographical encoding technique used to hide content is often selected based on file format of the carrier file (e.g., the original media file in which the malware is hidden). For example, PNG formatted files are good candidates for sequential or random least significant bit steganographic encoding, while MP3 files are good carriers for spread spectrum steganographic encoding techniques. The stegano-based detector & remediator 125 takes advantage of this fact by choosing one or more detection techniques based on the type of file format being examined. For example, when the media file belongs to the image/PNG carrier family, the image stegano detector 218 may select RS analysis, Sample Pairs, and/or Neighborhood Histogram as the best candidates for detecting hidden-content. Selecting a detection technique based on the file format helps to ensure the speed and accuracy of the detection system 204.

Figure 6:
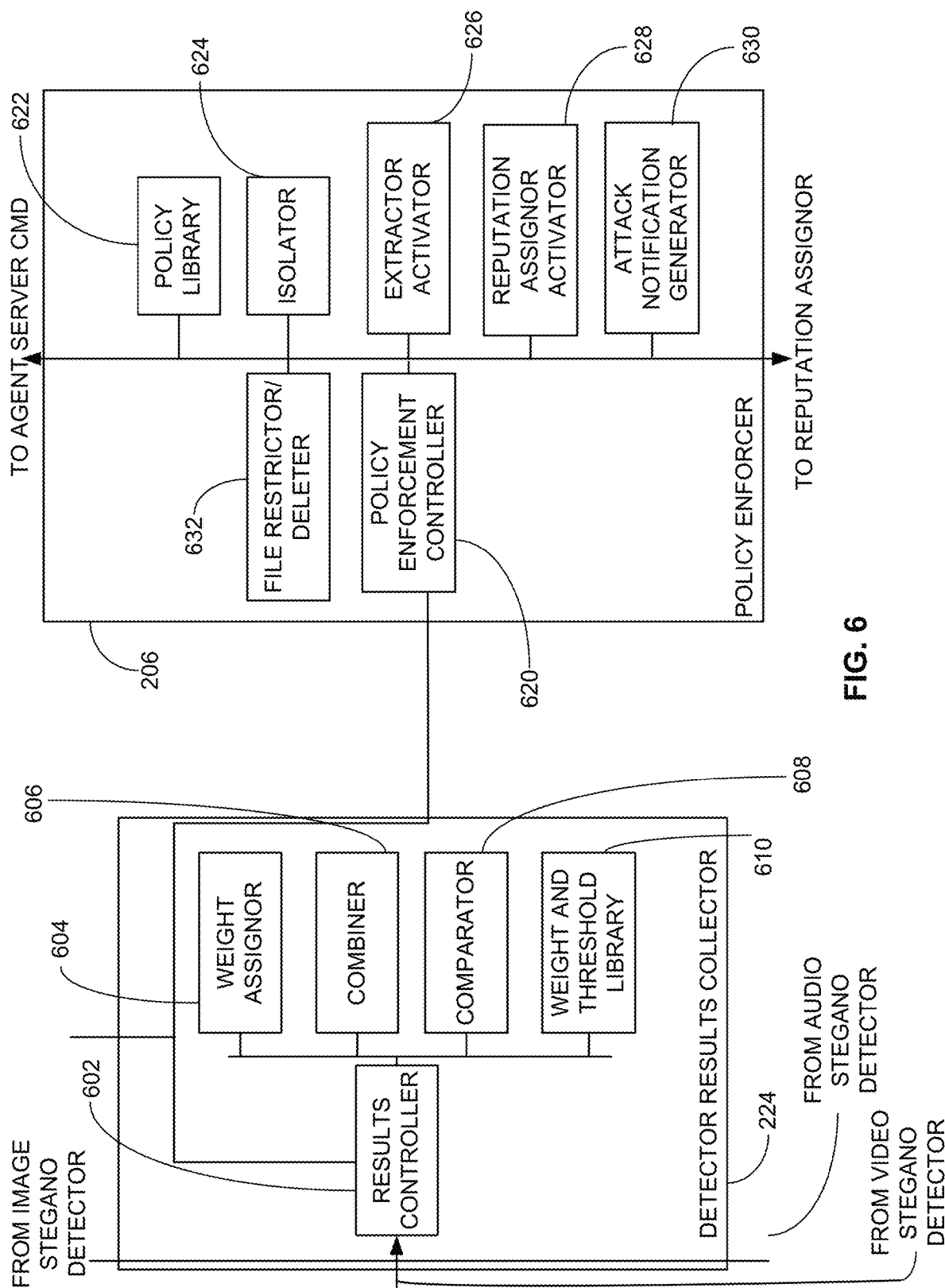
FIG. 6 is a block diagram of example implementations of an example detector results collector and an example policy enforcer which are included in the example stegano-based detector and remediator of FIG. 1 and FIG. 2.

FIG. 6 is a block diagram of an example implementation of the example detector results collector 224 and the example policy enforcer 206. The detector results collector 224 includes an example results controller 602, an example weight assignor 604, an example combiner 606, an example comparator 608, and an example weight and threshold library 610. In some examples one or more of the example image, video and audio stegano detectors 218, 220, 222 (see FIG. 2) supply, to the example detector results collector 224, the results obtained from applying selected detection techniques to the media file. Any and all of the detector results may also include information about the type of technique used to generate the detector result. The results controller 602 of the detector results collector 224 receives the detector results and the information regarding the types of detection technique used to generate the corresponding detector results. In some examples, the results controller 602 causes the weight assignor 604 to assign a weight to each of the results. In some examples, the weight assigned depends on the type of detection technique used to generate the results. In some examples, the weight assignor 604 determines the weight to be assigned to the results based on information stored in the weight and threshold library 610. In some such examples, the weight and threshold library 610 stores a list of detection technique and further stores, in association with respective ones of the detection techniques, a weight to be assigned to results associated with the technique. The results controller 602 also causes the combiner 606 to combine the weighted detection results and further causes the comparator 608 to compare the combined, weighted results to a detection threshold obtained from the weight and threshold library 610. In some examples, the comparator 608 obtains the detection threshold to be used in a comparison based on the type of detection technique used to generate the results. When the comparator 608 determines that the combined, weighted results meet or exceed the detection threshold, the comparator 608 notifies the results controller 602 which provides a first notification to the example policy enforcer 206 (see FIG. 2) and a second notification to the example signature supervisor 226.

In some examples, the first notification transmitted by the example detector results collector 224 to the example policy enforcer 206 includes the media file in which the steganographically hidden content has been detected, the results information, and information about the format, characteristics, and sub-characteristics of the media file. The policy enforcer 206 responds to the information by enforcing an appropriate one of a set of policies stored in the policy enforcer as described further below. In some examples, the second notification transmitted by the detector results collector 224 to the example signature supervisor 226 includes a copy of the media file in which steganographically hidden content has been detected, and information indicating that the media file has been determined to contain steganographically hidden content. In some examples, the signature supervisor 226 responds to the second notification by generating a signature of the media file and storing a copy of the signature, a copy of the media file and information identifying the media file (e.g., a file name) in the knowledge database 228 for usage by the example signature-based detector 214 in detecting later intercepted copies of the media file.

As further illustrated in the block diagram of FIG. 6, the example policy enforcer 206 includes an example policy enforcement controller 620, an example policy library 622, an example isolator 624, an example extractor activator 626, and an example reputation assignment activator 628. In some examples, the first notification includes the media file in which steganographically hidden content has been detected, the format, the characteristics and the sub-characteristics of the media file and the detector results and is supplied by the detector results collector 224 to the policy enforcement controller 620. The policy enforcement controller 620 responds to the first notification by consulting the policy library 622 for a remediation policy pertaining to the media file. In some examples, the policy library 622 includes a list of media file names identifying files known to contain steganographically hidden content. In some such examples, the policy enforcement controller 620 uses the name of the file to access a corresponding remediation policy in the policy library 622 to be enforced against the media file. In some examples, the name of the media file does not correspond to any of the file names included in the policy library 622. In some such examples, the policy enforcement controller 620 notifies the extractor activator 626. The extractor activator 626 responds to the notification by activating the example extractor 210 (see FIG. 2) and transmitting the media file to the extractor 210.

Referring again to FIG. 2, in some examples, the example hidden content estimator 234 of the example extractor 210 receives the media file from the extractor activator 626 and analyzes the media file to estimate which portion of the media file is most likely to contain the steganographically hidden content. The hidden content estimator 234 then provides information identifying the portion of the media file estimated as most likely to contain the hidden content to the example hidden content extractor 236. The hidden content extractor 236 extracts the steganographically hidden content from the media file and supplies the extracted content to the example attack classifier 238. In some examples, the attack classifier 238 analyzes the extracted content to determine which type of attack is associated with the extracted content. In some examples, the type of attack is a malvertising attack involving an executable file hidden in a web page advertisement. Such malvertising attacks typically exploit a weakness in a computing device that accesses the webpage containing the advertisement. In some examples, the type of attack indicates an exfiltration attack in which a third party (through the use of malware installed on one or more of the example computing devices 115A-115D) has caused confidential information of the entity associated with the site 105 (see FIG. 1) to be steganographically hidden in the media file before transmission of the media file to a destination external to the site 105. Exfiltration attacks are used by nefarious entities seeking to exploit the confidential/proprietary information owned or controlled by individuals and/or entities (e.g., businesses, governmental agencies, not-for-profit organizations, professional organizations, etc.). In some examples, the extractor 210 provides information back to the policy enforcement controller 620 identifying the type of attack associated with the extracted steganographically hidden content.

In some examples, the example policy enforcement controller 620 responds to the information identifying the type of attack by accessing the policy library 622 to identify a remediation policy to be enforced against media files containing similar types of attacks. In some examples, the policy library 622 stores information identifying different types of attacks and further storing a remediation policy in association with each such type of attack. In some examples, the enforcement policies stored in the library identify actions to be taken with respect to the media file when the media file is determined to have the corresponding type of attack. The actions to be taken can include isolating the media file. When the remediation policy indicates that the media file is to be isolated, the policy enforcement controller 620 informs the example isolator 624 which responds by causing the file to be stored in an isolation region of a hard disk associated with the stegano-based detector and remediator 125. The actions to be taken can also include preventing the media file from being transmitted offsite and/or deleting the file. In some examples, when the remediation policy indicates the media file is to be restricted from leaving the site 105 (see FIG. 1) and/or deleted, the policy enforcement controller 620 alerts the example file restrictor/deleter 632 which responds by deleting the media file and/or otherwise ensuring that the media file is not deposited back into the flow of traffic 250 entering/leaving the stegano-based detector and remediator 125. Another example action includes notifying one (or more) of the computer devices 115A-115D determined to be the sender (or intended recipient) of the media file that the media file contains steganographically hidden content. When the remediation policy indicates that a notification/message is to be transmitted to the sender (or intended recipient) of the media file, the policy enforcement controller 620 informs the attack notification generator 630 which responds by generating a message/notification alerting the sender (or intended recipient) about the media file containing the steganographically hidden content and, in some examples, identifying the type of attack associated with the steganographically hidden content. The message/notification can also provide additional information about the media file including the time/date of transmission, the party (if known) associated with generating the attack, a software application (if known) associated with generating the media file, information about any actions to take in response to the would-be attack and/or to prevent future such attacks, etc. In some examples, when an image file containing hidden steganographic content is detected, the policy enforcer 206 runs a command in the agent/endpoint (e.g., the computer devices 115A-115D) to delete the file, likewise, when an audio file containing steganography is detected, the policy enforcer 203 can run a command to stop the network transmission of the audio packages.

Referring also to FIG. 2, in some examples in addition to identifying and enforcing a remediation policy to be applied against the media file, the example policy enforcer controller 620 also provides the media file to the example reputation assignor activator 628. The reputation assignor activator 628 sends an activation signal containing the media file to the example resource context gatherer 230 of the example reputation assignor 208 (see FIG. 2). In response to the activation signal, the resource context gatherer 230 gathers context about the media file. In some examples, the context includes a source device (or address of a source device) from which the media file originated, a destination device (or address of a destination device) that is the intended recipient of the media file, a software application used to generate the media file, a user or entity (if known) associated with the media file, etc. In some examples, the resource context gatherer 230 gathers the context information using header information transmitted with the media file. In some examples, the resource context gatherer 230 gathers the context information by accessing the Internet, by accessing computing devices 115A-115D located at the site 105, etc. The resource context gatherer 230 transmits the gathered context information to the example reputation rating assignor 232 of the reputation assignor 208. The reputation rating assignor 232 uses the context information to assign a rating to one or more of the type of format of the media file, the software application used to generate the file, a website associated with a malvertising attack, etc. In some examples, the reputation assignor 232 bases the rating on the context information received in connection with the media file and on context information received in connection with media files determined to have steganographically hidden content at an earlier time. In some such examples, when a first software application is determined to be used to generate multiple media files that contain steganographically hidden content, the reputation rating assignor 232 assigns the first software application a rating that may indicate a likelihood that future intercepted media files generated by the first software application will generate another media file with steganographically hidden content. In some examples, media files generated by the first software application are subjected to a higher level of scrutiny/detection than media files generated using a second software application that has never been (or is rarely) associated with a media file containing steganographically hidden content. In some examples, the reputation rating assignor 232 assigns a rating that indicates a higher level of scrutiny/detection is to be applied to media files having a type of format (e.g., JPG, MPEG-4, etc.) that is known to frequently contain steganographically hidden content. In some examples, the reputation assigned to a type of file format, to a software application, to a website, to a user, etc., is supplied by the reputation rating assignor 232 to the example policy enforcement controller 620 of the example policy enforcer 206. In some examples, the policy enforcement controller 620 stores the ratings in the policy library 622 in association with the type of file format, software application, website, and/or user and/or uses the reputation ratings to adjust the probabilities stored in the example classification tree 400 (see FIG. 4) and associated with file formats/characteristics/sub-characteristics.

FIG. 3B is a block diagram of an example implementation of the example second media classifier 216B and includes an example classification tree library 302B and an example tree traverser 304B. In some examples, the remediation policy to be enforced against the media file specifies that the media file (or content contained therein) is to be remediated. Referring to FIGS. 2 and 3B, in some such examples, the example policy enforcement controller 620 (see FIG. 6) transmits the media file (or a copy thereof) to the example remediator 212 with instructions to remediate the file. In some examples, the media file and accompanying instructions are received at the second media classifier 216B of the remediator 212. The second classification tree library 302B and the second tree traverser 304B of the second media classifier 216B operate in the same manner as the first classification tree library 302B and the first tree traverser 304B (described with reference to FIG. 3A) to classify the media file as containing content having a type of file format, having a set of characteristics and having a set of sub-characteristics. In some examples, the second media classifier 216B provides the media file and information identifying the type of file format, characteristics, and sub-characteristics to the example disruptor 242. In some such examples, a set of example disruption techniques 246 stored in the example disruptor library 244 are different types of disruption techniques, and the different types of disruption techniques are suited to disrupt content based on a type of encoding technique used to steganographically hide the undesired content. In many instances, the type of encoding technique used to steganographically hide the undesired content depends on the type of file format, characteristics, sub-characteristics of the media file. Thus, in some examples, a disruption technique used to disrupt the media file is based on the type of file format, characteristics, and sub-characteristics of the media file. As such, the disruptor 242 selects a suitable one of the set of example disruption techniques 246 to disrupt the steganographically hidden content in the media file based on the type of file format, characteristics and sub-characteristics of the media file as determined by the second media classifier 216B. The disruption techniques 246, when applied to media files, modify the content of the media files in a manner that disrupts the steganographically hidden content without harming or corrupting original media file content into which the steganographically hidden content was inserted.

Figure 7:
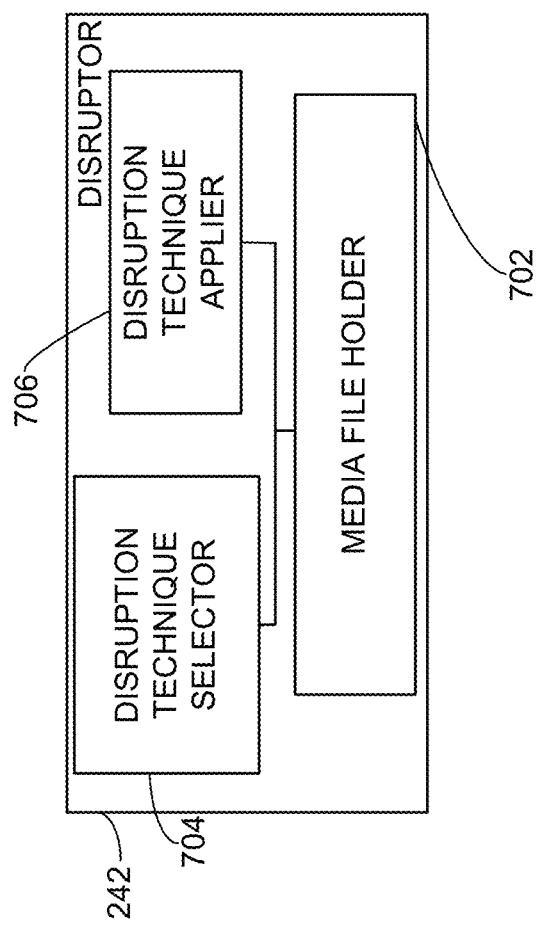
FIG. 7 is a block diagram of an example implementation of an example disruptor which is included in the example stegano-based detector and remediator of FIG. 1 and FIG. 2.

FIG. 7 is a block diagram of an example implementation of the example disruptor 242. In some examples, the disruptor 242 includes an example media file holder 702, an example disruption technique selector 704 and an example disruption technique applier 706. The second media classifier 216B supplies the media file to the media file holder 702 and supplies the file format, characteristics and sub-characteristics to the disruption technique selector 704. The disruption technique selector 704 evaluates the supplied information and, based on the information, determines which of the disruption techniques 246 stored in the example disruptor library 244 (see FIG. 2) is to be applied to the media file. In some such examples, the disruption technique selector 704, selects an appropriate one of the disruption techniques 246 and supplies the disruption technique to the disruption technique applier 706. The disruption technique applier 706 applies the technique to the media file stored in the media file holder 702. After the steganographically hidden content in the media file has been disrupted, the disruption technique applier 706 causes the media file to be deposited/delivered back into the flow of traffic 250 entering/leaving the gateway device 120 (see FIG. 1).

In some examples, a disruption technique includes encoding random least significant bits in the media content contained in the media file. In some such examples, the disruption technique applier 706 randomly selects least significant bits in the media content media file and encodes such selected least significant bits. In some examples the encoding of the least significant bits includes setting the randomly selected least significant bits, clearing the least significant bits and/or changing the least significant bits from a zero to one or a one to zero.

Figure 8A:
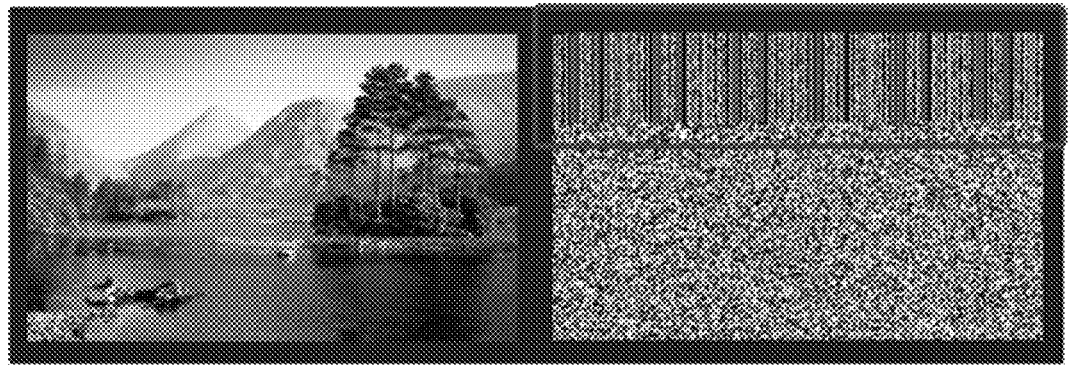
FIG. 8A illustrates an example image both before being disrupted by the example disruptor of FIG. 7.
Figure 8B:
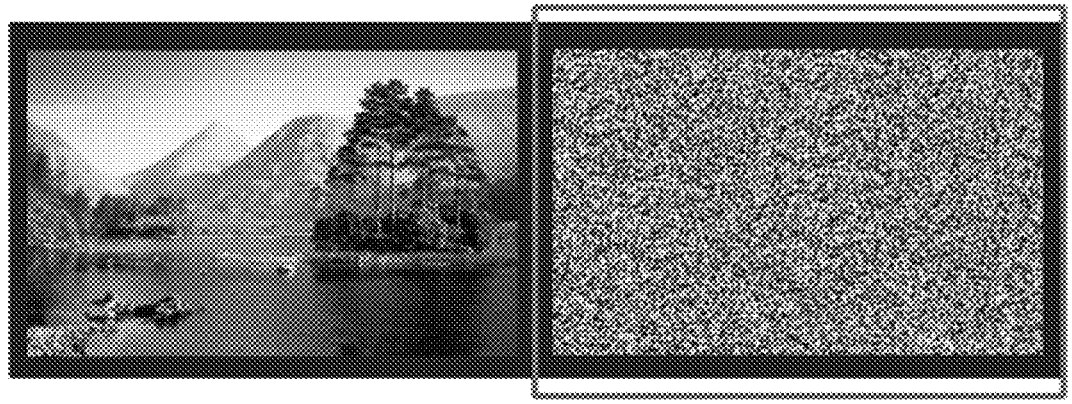
FIG. 8B illustrates the example image of FIG. 8A after being being disrupted by the example disruptor of FIG. 7.

FIG. 8A illustrates an example image containing steganographically hidden content (shown to the right of the image) before the least significant bit disruption technique has been applied. FIG. 8B illustrates the example image of FIG. 8A containing steganographically hidden content after the least significant bit disruption technique has been applied. As illustrated, although, the steganographically hidden content is disrupted, the image remains unharmed and can, therefore still be used for its originally intended purpose without needing to delete the media file.

In some examples, the example remediator 212 receives a media file from the example media file interceptor 202 (see FIG. 2) after the media file is intercepted from the flow of traffic 250. In some such examples, the example media file is received at the example second media classifier 216B of the example remediator 212. The second classification tree library 302B and the example second tree traverser 304B of the example second media classifier 216B operate in the same manner described above to classify the media file and also to obtain a probability that the media file contains steganographically hidden content. In some such examples, the second tree traverser 304B determines whether the probability exceeds a probability threshold. If the probability threshold is exceeded, the second tree traverser 304B transmits the media file and classification information to the disruptor 242. The example disruption technique selector 704 of the disruptor 242 selects a suitable one of the set of example disruption techniques 246 to disrupt the steganographically hidden content in the media file based on the type of file format, characteristics and sub-characteristics of the media file as determined by the second media classifier 216B. The example disruption technique applier 706 then applies the technique to the media file which is stored in the example media file holder 702. After the steganographically hidden content in the media file has been disrupted, the disruption technique applier 706 causes the media file to be deposited/delivered back into the flow of traffic 250 entering/leaving the gateway device 120 (see FIG. 1). Thus, in some examples, the remediator 212 can disrupt the content of any and/or all media files that are associated with a probability of containing steganographically hidden content that satisfies a threshold probability. In this manner, the detection system 204 and the policy enforcer 206 can be bypassed and thereby allow the stegano-based detector & remediator 125 to operate on a greater number of files more quickly than in systems in which the bypassing is omitted.

While an example manner of implementing the stegano-based detector & remediator 125 of FIG. 1 is illustrated in FIGS. 2, 3A, 3B, 4, 5, 6, and 7, one or more of the elements, processes and/or devices illustrated in FIGS. 2, 3A, 3B, 4, 5, 6, and 7 may be combined, divided, re-arranged, omitted, eliminated and/or implemented in any other way. Further, the example media file interceptor 202, the example detection system 204, the example policy enforcer 206, the example reputation rating assignor 208, the example extractor 210, the example remediator 212, the example signature, based detector 214, the example first media classifier 216A, the example second media classifier 216B, the example image stegano detector 218, the example audio stegano detector 220, the example video stegano detector 222, the example detector results collector 224, the example signature supervisor 226, the example knowledge database 228, the example resource context gatherer 230, the example reputation rating assignor 232, the example hidden content estimator 234, the example hidden content extractor 236, the example attack classifier 238, the example disruptor 242, the example disruptor library 244, the example disruption techniques 246, the example first classification tree library 302A, the example first tree traverser 304A, the example second classification tree library 302B, the example second tree traverser 304B, the example classification tree 400, the example image detection technique library 502, the example first media file analyzer 504, the example image detection technique applicator 506, the example video detection technique library 508, the example second media file analyzer 510, the example video detection technique applicator 512, the example audio detection technique library 514, the example third media file analyzer 516, the example audio detection technique applicator 518, the example results controller 602, the example weight assignor 604, the example combiner 606, the example comparator 608, the example weight and threshold library 610, the example policy enforcement controller 620, the example policy library 622, the example isolator 624, the example extractor activator 626, the example reputation assignor activator 628, the example attack notification generator 630, the example file restrictor/deleter 632, the example media file holder 702, the example disruption technique selector 704, and the example disruption technique applier 706, and/or, more generally, the example stegano-based detector & remediator 125 may be implemented by hardware, software, firmware and/or any combination of hardware, software and/or firmware. Thus, for example, any of the example media file interceptor 202, the example detection system 204, the example policy enforcer 206, the example reputation rating assignor 208, the example extractor 210, the example remediator 212, the example signature, based detector 214, the example first media classifier 216A, the example second media classifier 216B, the example image stegano detector 218, the example audio stegano detector 220, the example video stegano detector 222, the example detector results collector 224, the example signature supervisor 226, the example knowledge database 228, the example resource context gatherer 230, the example reputation rating assignor 232, the example hidden content estimator 234, the example hidden content extractor 236, the example attack classifier 238, the example disruptor 242, the example disruptor library 244, the example disruption techniques 246, the example first classification tree library 302A, the example first tree traverser 304A, the example second classification tree library 302B, the example second tree traverser 304B, the example classification tree 400, the example image detection technique library 502, the example first media file analyzer 504, the example image detection technique applicator 506, the example video detection technique library 508, the example second media file analyzer 510, the example video detection technique applicator 512, the example audio detection technique library 514, the example third media file analyzer 516, the example audio detection technique applicator 518, the example results controller 602, the example weight assignor 604, the example combiner 606, the example comparator 608, the example weight and threshold library 610, the example policy enforcement controller 620, the example policy library 622, the example isolator 624, the example extractor activator 626, the example reputation assignor activator 628, the example attack notification generator 630, the example file restrictor/deleter 632, the example media file holder 702, the example disruption technique selector 704, and the example disruption technique applier 706, and/or, more generally, the example stegano-based detector & remediator 125 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media file interceptor 202, the example detection system 204, the example policy enforcer 206, the example reputation rating assignor 208, the example extractor 210, the example remediator 212, the example signature, based detector 214, the example first media classifier 216A, the example second media classifier 216B, the example image stegano detector 218, the example audio stegano detector 220, the example video stegano detector 222, the example detector results collector 224, the example signature supervisor 226, the example knowledge database 228, the example resource context gatherer 230, the example reputation rating assignor 232, the example hidden content estimator 234, the example hidden content extractor 236, the example attack classifier 238, the example disruptor 242, the example disruptor library 244, the example disruption techniques 246, the example first classification tree library 302A, the example first tree traverser 304A, the example second classification tree library 302B, the example second tree traverser 304B, the example classification tree 400, the example image detection technique library 502, the example first media file analyzer 504, the example image detection technique applicator 506, the example video detection technique library 508, the example second media file analyzer 510, the example video detection technique applicator 512, the example audio detection technique library 514, the example third media file analyzer 516, the example audio detection technique applicator 518, the example results controller 602, the example weight assignor 604, the example combiner 606, the example comparator 608, the example weight and threshold library 610, the example policy enforcement controller 620, the example policy library 622, the example isolator 624, the example extractor activator 626, the example reputation assignor activator 628, the example attack notification generator 630, the example file restrictor/deleter 632, the example media file holder 702, the example disruption technique selector 704, and the example disruption technique applier 706, is/are hereby expressly defined to include a non-transitory computer readable storage device or storage disk such as a memory, a digital versatile disk (DVD), a compact disk (CD), a Blu-ray disk, etc. including the software and/or firmware. Further still, the example stegano-based detector &remediator 125 of FIG. 1 may include one or more elements, processes and/or devices in addition to, or instead of, those illustrated in FIGS. 2, 3A, 3B, 4, 5, 6, and 7, and/or may include more than one of any or all of the illustrated elements, processes and devices.

Figure 9:
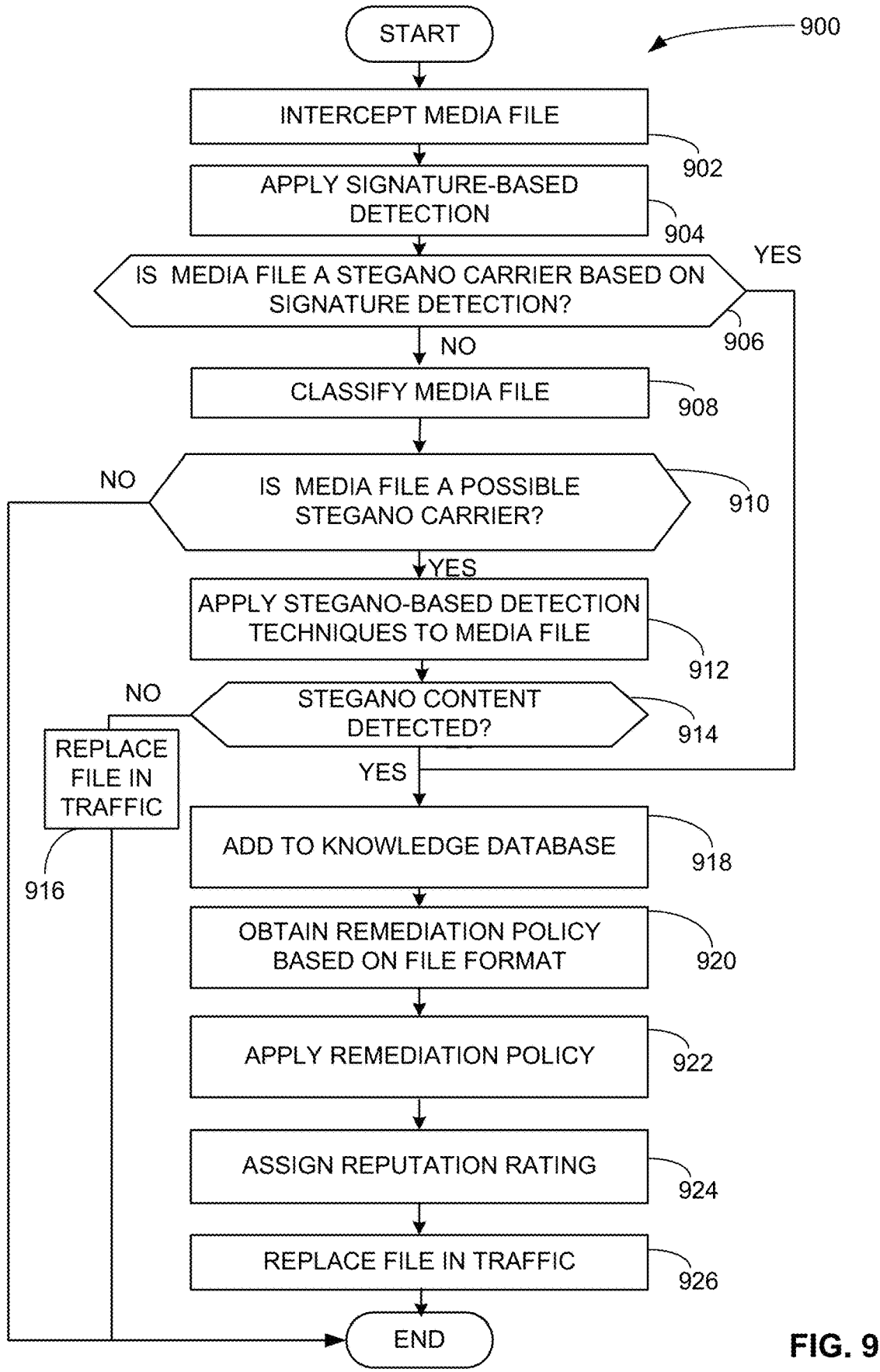
FIG. 9 is a flow chart representative of example machine readable instructions which may be executed to implement the example stegano-based detector and remediator of FIG. 1 and FIG. 2.
Figure 10:
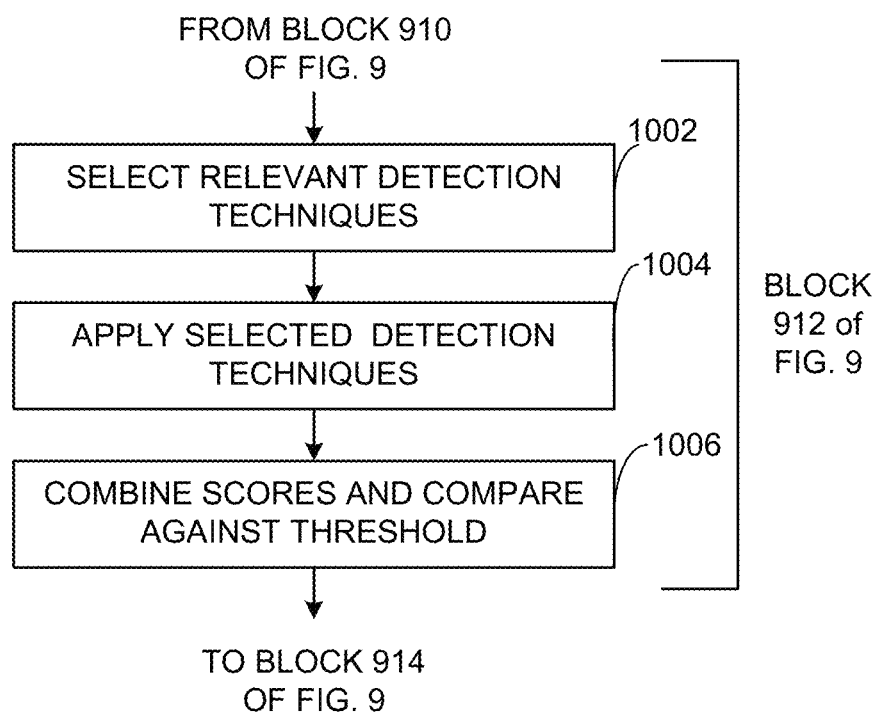
FIG. 10 is a flow chart representative of example machine readable instructions which may be executed to implement one or more of the example image stegano detector, the example video stegano detector, the example audio stegano detector, and an example detector results collector of FIG. 2.
Figure 11:
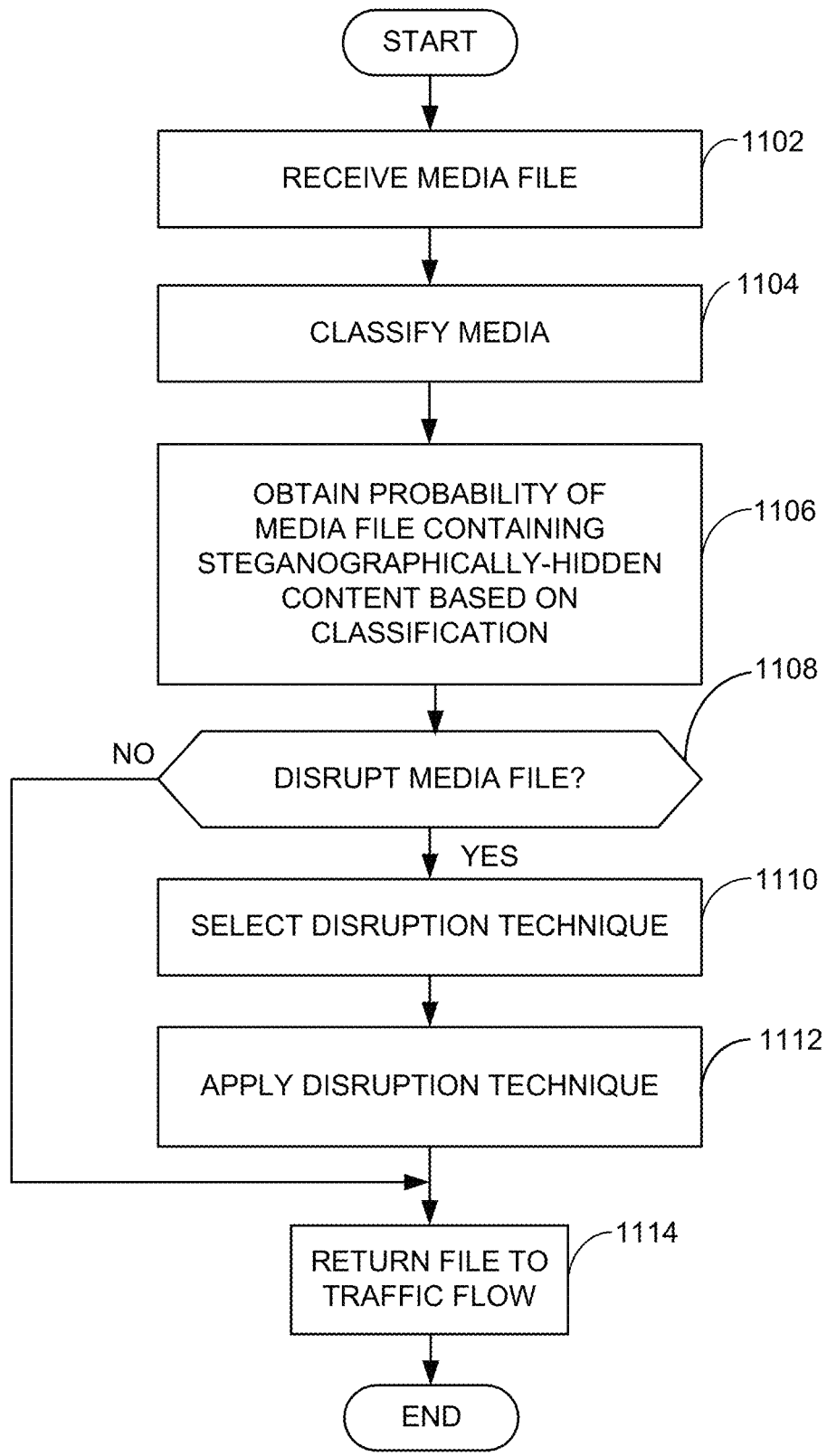
FIG. 11 is a flow chart representative of example machine readable instructions which may be executed to implement an example remediator which is included in the example stegano-based detector and remediator of FIG. 1 and FIG. 2.

Flowcharts representative of example machine readable instructions for implementing the example stegano-based detector & remediator 125 of FIG. 1 and FIG. 2 are shown in FIGS. 9, 10 and 11. In these examples, the machine readable instructions comprise a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 9, 10 and 11, many other methods of implementing the example stegano-based detector and & remediator 125 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9, 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 900 of FIG. 9 begins at block 902 at which the example media file interceptor 202 (see FIG. 2) accesses a flow of traffic 250 entering and/or leaving the gateway device 120 (see FIG. 1) to obtain a file contained in the traffic 250. In some examples, in addition to intercepting the file, the media file interceptor 202 determines whether the file is a media file (e.g., whether the file contains an image, video, audio, etc.). Provided that the file is a media file, the media file interceptor 202 supplies the media file to the example detection system 204. The example signature-based detector 214 of the detection system 204 applies a signature based detection technique to the media file by generating a signature based on the media file and comparing the media file to one or more signatures included in the example knowledge data base 228 (block 904). If the generated signature does not match a signature contained in the knowledge database 228, the signature-based detector 214 determines the media file does not include steganographically hidden content that is detectable based on the signature detection technique (block 906) and supplies the media file to the first media classifier 216A. The example first media file evaluator 306A of the first media classifier 216A evaluates the media file and classifies the media file by identifying a file format, characteristics and (potentially) sub-characteristics of the media file (block 908). In addition, the example first tree traverser 304A of the first media classifier 216A uses the file format, characteristics and sub-characteristics to traverse the example classification tree 400 (see FIG. 4) and identify a probability of the media file containing steganographically hidden content (also block 908). If the probability exceeds a probability threshold, the first tree traverser 304A determines that the likelihood of the media file containing steganographically hidden content is high enough to warrant applying further detection techniques to the media file and supplies the media file to the one or more of the example image stegano detector 218, the example video stegano detector 220, and the example audio stegano detector 222.

One or more of the example image stegano detector 218, the example video stegano detector 220, and the example audio stegano detector 222 apply detection techniques to the media file (block 912). In some examples, the stegano-based detection techniques applied to the media file are selected based on the file format, the characteristics and the sub-characteristics of the media file. The example detector results collector 224 collects the results of the detection techniques applied by one or more of the image, video and/or audio stegano detectors 218, 220, 222 and determines whether the results indicate that the media file contains steganographically hidden content (block 914). If steganographically hidden content is not detected, the detector results collector 224 informs the example policy enforcer 206 which responds by causing the media file to be replaced/redeposited into the flow of traffic 250 entering/leaving the gateway device 120 (block 916). If steganographically hidden content is detected, the detector results collector 224 alerts the example signature supervisor 226 which responds by generating a signature of the media file and storing the signature and information about the media file in the example knowledge database 228 for use in detecting copies of the media file that are intercepted in the future (block 918).

In addition, the example detector results collector 224 informs the example policy enforcer 206 that the media file contains steganographically hidden content and supplies the media file and any related information to the policy enforcer 206. The policy enforcer 206 responds by obtaining, from the example policy library 622, a remediation policy for the media file (block 920). In some examples, the remediation policy is selected based on one or more of the file format, characteristics, sub-characteristics of the media file. In some examples, the remediation policy is selected based on a name of the media file. In some examples, the remediation policy is selected based on an IP address associated with a destination or source of the media file. In some examples, the remediation policy is selected based on an analysis by the example extractor 210. In some such examples, the extractor 210 identifies and extracts the steganographically hidden content and then proceeds to identify/classify the type of attack (e.g., data exfiltration event, malware-based exploitation of computing weaknesses, etc.) conducted via the steganographically hidden content. In some such examples, the extractor 210 supplies information about the type of attack to the policy enforcer 206 for use in selecting an appropriate remediation policy. In some examples, the extractor 210 is actuated by the policy enforcer 206 after the remediation policy has been applied for use in conducting a post mortem of the steganographically-based attack.

The example policy enforcer 206 applies the remediation policy to the media file (block 922). In some examples, the remediation policy specifies that the media file is to be isolated/quarantined, deleted, disrupted, etc. In some examples, the remediation policy specifies that notifications are to be generated and transmitted to users/devices subject to the steganographically-based attack. After (or before) the remediation policy has been enforced, the policy enforcer 206 supplies the media file and associated information to the example reputation assignor 208. The example resource context gatherer 230 of the reputation assignor 208 collects information about the media file and compares the information to other steganographically-based attacks. Based on the collected information, the example reputation rating assignor 232 of the example reputation assignor 208 assigns a reputation rating to the media file, and/or any of entities associated with the media file, computing devices associated with the media file, software applications used to generate the media file, a file format of the media file, a website associated with the media file, etc. (block 924). Thereafter, if appropriate (e.g., if in compliance with the applied remediation policy), the media file is returned to the flow of traffic 250 entering/leaving the gateway device 120 (see FIG. 1) (block 926) and the program ends. The program 900 describes the method as applied to a single media file intercepted from the flow of traffic 250 to/from the gateway device 120. In operation, the operations described in connection with the program 900 are repeated on any and/or all of the media files intercepted from the flow of traffic 250.

The program 1000 of FIG. 10 represents the program block 912 of FIG. 9 and begins at block 1002 at which the one or more of the image stegano detector 218, the example video stegano detector 220, and the example audio stegano detector 222 identify/select one or more detection techniques to be applied to the media file. In some examples, the detection technique is selected/identified based on the type of file format, characteristics, and/or sub-characteristics associated with the media file. In some such examples, the first media file analyzer 504, the second media file analyzer and/or the third media file analyzer 516 of the respective image stegano, video stegano and audio stegano detectors 218, 220, 222 analyzes the media file and the related information supplied by the first media classifier 216A. The first, second and/or third media file analyzers 504, 510, 516 use the information to select one or more detection techniques from a respective one of the image detection technique library 502, the video detection technique library 508 and the audio detection technique library 514, that are best-suited to detect steganographically hidden content in the media file. appropriate for the media file. Upon selecting one or more detection techniques, one or more of the image detection technique applicator 506, the video detection technique applicator, and/or the audio detection technique applicator 518 apply the one or more detection techniques to the media file (block 1004). After applying the techniques, one or more of the image detection technique applicator 506, the video detection technique applicator, and/or the audio detection technique applicator 518 supply results to the example detector results collector 224 at which the results are weighted, combined and compared to a detection threshold (block 1006). In some examples, the results are received by the example results controller 602 of the detector results collector 224 which supplies the results to the example weight assignor 604. The weight assignor 604 assigns a weight to the results based on the types of technique used to generate the results. The weighted results are supplied to the example combiner 606 of the example detector results collector 224. The combiner 606 combines the weighted results and supplies the weighted results to the example comparator 608. The comparator 608 compares the combined, weighted results to an example detection threshold stored in the example weight and threshold library 610. An example threshold value is 0.2 (in a range from 0 to 1). As will be understood, the threshold value may be tuned as needed to obtain a desired level of detection. In most instances, a threshold value that is too high may cause the stegano-based detector & remediator 125 to be less sensitive to steganographically hidden content, which, in turn, may cause the stegano-based detector & remediator 125 to miss media files that conceal small amounts of information. Similarly, a threshold value that is too low may cause the stegano-based detector & remediator 125 to be overly sensitive thereby risking the generation of false positives (e.g., the identification of files as containing steganographically hidden content, when in fact, no such hidden content is contained in the file).

In some examples, the weights used by the weight assignor 604 are also stored in the weight and threshold library 610. The results of the comparison are used to determine whether steganographically hidden content has been detected in the media file at the block 914 of FIG. 9. In some examples, if the detection threshold is exceeded, steganographically hidden content has been detected and if not, steganographically hidden content has not been detected. The results of the comparison are used to determine whether the media file will be subject to a policy enforcement or not as described with reference to blocks 914-926 of FIG. 9. After the block 1006, the program 1000 continues at the block 914 of FIG. 9.

The program 1100 of FIG. 11 begins at block 1102 at which the example the example remediator 212 receives a media file from the example media file interceptor 202 (see FIG. 2) after the media file is intercepted from the flow of traffic 250. In some such examples, the example media file is received at the example second media classifier 216B of the example remediator 212. The second classification tree library 302B and the example second tree traverser 304B of the example second media classifier 216B operate to classify the media file (block 1104). Based on the classification, the tree traverser 304B obtains a probability of the media file containing steganographically hidden content (block 1106) and compares the probability to a probability threshold (block 1108) to determine whether the content of the media file is to be disrupted. If the probability does not satisfy the probability threshold, the tree traverser 304B causes the example disruptor 242 to return the media file to the flow of traffic 250 without applying any disruption techniques to the media file (block 1114). If the probability satisfies the probability threshold, the tree traverser 304B supplies the media file and classification information to the disruptor 242. The example disruption technique selector 704 of the disruptor 242 selects a suitable one of the set of example disruption techniques 246 to disrupt the steganographically hidden content in the media file based on the classification information (e.g., the type of file format, the characteristics and the sub-characteristics of the media file) as determined by the second media classifier 216B (block 1110). The example disruption technique applier 706 then applies the technique to the media file which is stored in the example media file holder 702 (block 1112). In some examples, after the steganographically hidden content in the media file has been disrupted, the disruption technique applier 706 causes the media file to be deposited/delivered back into the flow of traffic 250 entering/leaving the gateway device 120 (see FIG. 1). Thereafter the program 1100 ends.

Figure 12:
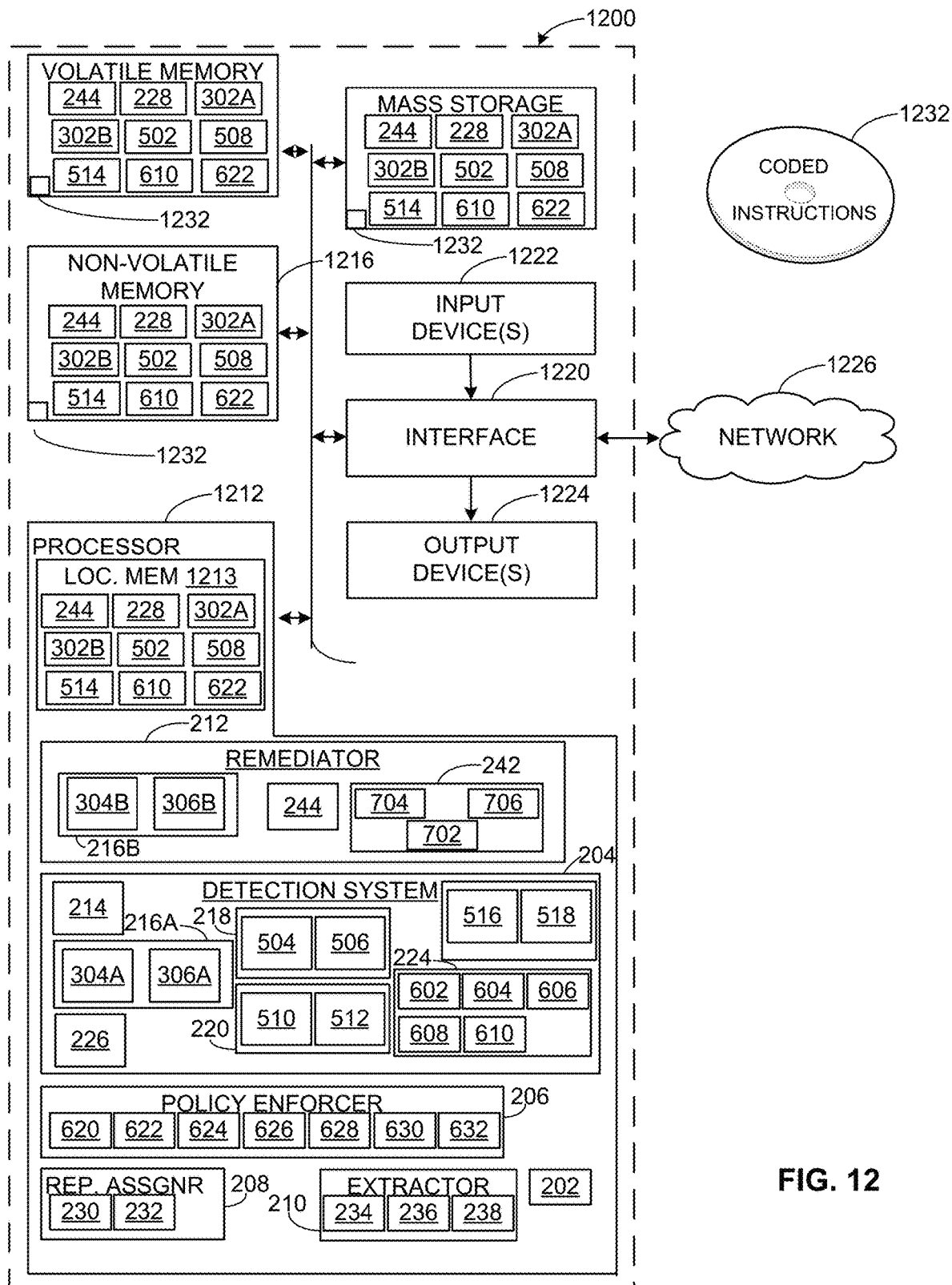
FIG. 12 is a block diagram of an example processor platform capable of executing the instructions of FIGS. 9, 10 and/or 11 to implement the example stegano-based detector and remediator of FIGS. 1 and/or 2.

FIG. 12 is a block diagram of an example processor platform 1200 capable of executing the instructions of FIGS. 9-11 to implement the apparatus of FIGS. 1, 2, 3A, 3B, 4, 5, 6, and/or 7. The processor platform 1200 can be, for example, a server, a personal computer, a mobile device (e.g., a cell phone, a smart phone, a tablet such as an iPad), an Internet appliance, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device.

In this example, the processor implements the example media file interceptor 202, the example detection system 204, the example policy enforcer 206, the example reputation assignor 208, the example extractor 210, the example remediator 212, the example signature based detector 214, the example first media classifier 216A, the example second media classifier 216B, the example image stegano detector 218, the example audio stegano detector 220, the example video stegano detector 222, the example detector results collector 224, the example signature supervisor 226, the example resource context gatherer 230, the example reputation rating assignor 232, the example hidden content estimator 234, the example hidden content extractor 236, the example attack classifier 238, the example disruptor 242, the example disruptor library 244, the example disruption techniques 246, the example first tree traverser 304A, the example second tree traverser 304B, the example first media file analyzer 504, the example image detection technique applicator 506, the example second media file analyzer 510, the example video detection technique applicator 512, the example third media file analyzer 516, the example audio detection technique applicator 518, the example results controller 602, the example weight assignor 604, the example combiner 606, the example comparator 608, the example policy enforcement controller 620, the example isolator 624, the example extractor activator 626, the example reputation assignor activator 628, the example attack notification generator 630, the example file restrictor/deleter 632, the example media file holder 702, the example disruption technique selector 704, and the example disruption technique applier 706.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller. In some examples, the non-volatile and volatile memories 1216, 1214 implement the example disruptor library 244, the example knowledge database 228, the example first classification tree library 302A, the example second classification tree library 302B, the example image detection technique library 502, the example video detection technique library 508, the example audio detection technique library 514, the example weight and threshold library 610, and the example policy library 622. In some examples, the mass storage devices 1228 implement the example disruptor library 244, the example knowledge database 228, the example first classification tree library 302A, the example second classification tree library 302B, the example image detection technique library 502, the example video detection technique library 508, the example audio detection technique library 514, the example weight and threshold library 610, and the example policy library 622.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor. In some examples, a network administrator could interact with the stegano-based detector & remediator 125 in different ways, depending on how the system is deployed. If the invention is running as a Gateway service, then the system would be configured and monitored through for example a web interface exposed by the system and accessible via the input devices 1222 and output devices 1224. As part of this interaction, the administrator would be able to monitor detections, configure remediation policies (e.g. delete the file or disrupt the file), alter and/or set the detection threshold values, alter or set the level of disruption to be applied (partial or full disruption), etc.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In some examples, the mass storage devices 1228 implement the example disruptor library 244, the example knowledge database 228, the example first classification tree library 302A, the example second classification tree library 302B, the example image detection technique library 502, the example video detection technique library 508, the example audio detection technique library 514, the example weight and threshold library 610, and the example policy library 622.

The coded instructions 1232 of FIGS. 9, 10 and 11 may be stored in the mass storage device 1228, in the volatile memory 1214, in the non-volatile memory 1216, and/or on a removable tangible computer readable storage medium such as a CD or DVD.

From the foregoing, it will be appreciated that example methods, apparatus and articles of manufacture have been disclosed that permit the detection and remediation of malware and/or confidential information that is steganographically hidden in media files in real time. As such stegano-based detector & remediators disclosed herein can be used to thwart a stegano-based attack before the attack has damaged software/hardware device and/or before confidential information has been leaked from a computing system operated by an entity. Disclosed stegano-based detector & remediators are able to rapidly evaluate media files by determining the file format, characteristics, and/or sub-characteristics of the media files and subjecting only some of the media files to the detection processes. In some disclosed examples, only the media files having a format, a set of characteristics, and/or a set of sub-characteristics associated with a probability that satisfies a probability threshold are subject to detection technique. The probability threshold, when satisfied, indicates the media file has a likelihood of containing steganographically hidden content that is high enough to warrant further detection processing. In addition, disclosed stegano-based detector & remediators subject the media file(s) to detection techniques that are best suited to detect hidden content based on the file format, characteristics, and/or a set of sub-characteristics. By limiting the detection techniques applied to a media file to those most likely to yield results, instead of all possible detection techniques, the stegano-based detector & remediators disclosed herein are able to operate at a high speed with a high degree of accuracy. Further, stegano-based detector & remediators disclosed herein can remediate media files that are known to contain or are suspected of containing steganographically hidden malware or confidential information. In some examples, remediation of the the media files includes disrupting the steganographically hidden content without damaging or otherwise corrupting the original content into which the malware has been hidden. As such, stegano-based detector & remediators disclosed herein represent a valuable advancement over existing stegano-based systems which are typically only able to detect steganographically hidden content in a post mortem fashion (e.g., after the attack has damaged the computing system or after proprietary information has been leaked/stolen).

The following further examples are disclosed herein.

Example 1 is a system to detect steganographically hidden content in a media file and includes a media classifier to determine a type of a media file, and a detector to apply a detection technique to the media file. The detector of Example 1 selects, based on the type, the detection technique from a plurality of steganographically based detection techniques. The system of Example 1 also includes a remediator to apply a remediation technique to the media file based on whether the detector detects steganographically hidden content in the media file.

Example 2 includes the system of Example 1. In Example 2, the media file is a first media file and the system of Example 2 further includes a media interceptor to intercept a plurality of files including the first media file transmitted on a data network. The files including a plurality of media files and a plurality of non-media files.

Example 3 includes the system of Example 1. In Example 3, the detector is a first detector, and the system of Example 3 further includes a second detector that applies a signature-based detection technique to determine whether the media file includes steganographically hidden content.

Example 4 includes the system of Example 1. In Example 4, the detector selects a first detection technique when the type is determined to be an image media file type, the detector selects a second detection technique when the type is determined to be an audio media file type, and the detector selects a third detection technique when the type is determined to be a video media file type.

Example 5 includes the system of any of Examples 1, 2, and 3. In Example 5, the detector includes a selector to select, based on the type, a first detection technique and a second detection technique from among the plurality of detection techniques. In Example 5, the detector also includes a detection technique applicator to apply the first and second detection techniques to the media file. In Example 5, the application of the first and second detection techniques yields first and second detection results. In Example 5, the detector also includes a comparator to compare a weighted combination of the first and second detection results to a threshold value, and a file identifier to identify the media file as containing steganographically hidden content based on the comparison of the weighted combination of the first and second detection results.

Example 6 includes the system of any of Examples 1, 2, and 3. In the system of Example 6, the remediator selects a remediation technique to be applied to the media file based on the type.

Example 7 includes the system of any of Examples 1, 2, and 3. In the system of Example 7, the remediator applies the remediation technique by modifying a least significant bit of bytes of data of the media file.

Example 8 includes the system of any of Examples 1, 2, and 3. The system of Example 7 further includes a policy enforcer that enforces a set of policies to be applied to the media file when the media file is determined to include steganographically hidden content. The policies specify remediation activities to be taken when steganographically hidden content is detected in the media file, and/or a reputation that has been assigned to a media handler associated with the media file.

Example 9 includes the system of any of Examples 1, 2, and 3. The system of Example 9 further includes a reputation assignor to assign a reputation to one or more media handlers based on a frequency at which media file types associated with the media handlers are determined to contain steganographically hidden content.

Example 10 includes one or more non-transitory machine-readable storage media storing machine-readable instructions. The machine-readable instructions, when executed, cause one or more processors to at least determine a media file type of a media file, and apply a detection technique to the media file. The detection technique is selected, based on the media file type, from a plurality of steganographically based detection techniques. The instructions of Example 10 further cause the one or more processors to apply a remediation technique to the media file based on whether the detector detects steganographically hidden content in the media file.

Example 11 includes the one or more non-transitory machine-readable storage media of Example 10. In Example 11, the instructions further cause the one or more processors to intercept a plurality of files on a data network. In Example 11, the files include media files and non-media files.

Example 12 includes the one or more non-transitory machine-readable storage media of Example 10. In Example 12, the instructions further cause the one or more processors to apply a signature based detection technique to determine whether the media file includes steganographically hidden content.

Example 13 includes the one or more non-transitory machine-readable storage media of Example 10. In Example 13, the instructions further cause the one or more processors to select a first detection technique when the media file type is determined to be an image media file type, to select a second detection technique when the media file type is determined to be an audio media file type, and to select a third detection technique when the media file type is determined to be a video media file type.

Example 14 includes the one or more non-transitory machine-readable storage media of any of Examples 10, 11, and 12. In Example 14, the instructions further cause the one or more processors to select, based on the media file type, a first detection technique and a second detection technique from among the plurality of detection techniques, and to apply the first and second detection techniques to the media file. In Example 14, the application of the first and second detection techniques yield first and second detection results. In Example 14, the instructions also cause the one or more processors to compare a weighted combination of the first and second detection results to a threshold value, and to identify the media file as containing steganographically hidden content based on the comparison of the weighted combination of the first and second detection results.

Example 15 includes the one or more non-transitory machine-readable storage media of any of Examples 10, 11, and 12. In Example 15, the instructions further cause the one or more processors to select a remediation method to be applied to the media file based on the media file type.

Example 16 includes the one or more non-transitory machine-readable storage media of any of Examples 10, 11, and 12. In Example 16, applying the remediation technique includes modifying a least significant bit of bytes of data of the media file.

Example 17 includes the one or more non-transitory machine-readable storage media of any of Examples 10, 11, and 12. In Example 17, the instructions further cause the one or more processors to manage a set of policies to be applied to the media file when the media file is determined to include steganographically hidden content. In Example 17, the policies specify at least one of remediation activities to be taken when steganographically hidden content is detected in the media file, and a reputation assigned to a media handler associated with the media file.

Example 18 includes the one or more non-transitory machine-readable storage media of any of Examples 10, 11, and 12. In Example 18, the instructions further cause the one or more processors to assign a reputation to one or more media handlers based on a frequency at which media file types associated with the media handlers are determined to contain steganographically hidden content.

Example 19 includes the one or more non-transitory machine-readable storage media of any of Examples 10, 11, and 12. In Example 19, the instructions further cause the one or more processors to determine, for a plurality of media file type formats, respective probabilities that media files having the respective media file type formats will contain steganographically hidden content.

Example 20 includes the one or more non-transitory machine-readable storage media of Example 19. In Example 19, the instructions further cause the one or more processors to apply the detection technique based on the media file type by applying the detection technique when the media file has a media file type and a media file type format associated with a probability of containing steganographically hidden content that exceeds a threshold value.

Example 21 is a method to detect steganographically hidden content in a media file and includes determining a type of media file, and applying a detection technique to the media file. In Example 21, the detection technique is selected, based on the type of media file, from a plurality of detection techniques. The method of Example 21 also includes applying a remediation technique to the media file based on whether the detector detects steganographically hidden content in the media file.

Example 22 includes the method of Example 21. The method of 21 further includes intercepting a plurality of media files on a data network.

Example 23 includes the method of Example 21. The method of Example 23 further includes applying a signature-based detection technique to determine whether the media file includes steganographically hidden content.

Example 24 includes the method of Example 21. The method of Example 21 further includes selecting a first detection technique when the media file type is determined to be an image media file type, and selecting a second detection technique when the media file type is determined to be an audio media file type. In Example 21, the method also includes selecting a third detection technique when the media file type is determined to be a video media file type.

Example 25 includes the method of any of Examples 21, 22, and 23. The method of any of Example 25 further includes selecting, based on the media file type, a first detection technique and a second detection technique from among the plurality of detection techniques, and applying the first and second detection techniques to the media file. In Example 25, the application of the first and second detection techniques yields first and second detection results. The method of Example 25 also includes comparing a weighted combination of the first and second detection results to a threshold value, and identifying the media file as containing steganographically hidden content based on result of the comparing of the weighted combination of the first and second detection results.

Example 26 includes the method of any of Examples 21, 22, 23, and 24. Example 26 further includes selecting a remediation method to be applied to the media file based on the type of media file.

Example 27 includes the method of any of Examples 21, 22, 23, and 24. In Example 27, the applying of the remediation technique includes modifying a least significant bit of bytes of data of the media file.

Example 28 is an apparatus to detect steganographically hidden content in a media file. The apparatus of Example 28 includes means to determine a type of a media file, and means to apply a detection technique to the media file. The detection technique in Example 28 is selected, based on the type, from a plurality of steganographically based detection techniques. The apparatus of Example 28 also includes means to remediate the media file based on whether steganographically hidden content is detected in the media file.

Example 29 includes the apparatus of Example 28. In Example 29, the media file is a first media file, and, the apparatus of Example 29 further includes means to intercept a plurality of files, including the first media file, from a flow of file traffic on a data network.

Example 30 includes the apparatus of Example 28. In Example 30, the media file is a first media file. The apparatus of Example 30 further includes means to compare a signature of the media file to a database of stored signatures associated with a plurality of media files to determine whether the media file includes steganographically hidden content.

Example 31 includes the apparatus of Example 28. In Example 31, the means to apply the detection technique selects a first detection technique to apply when the type is determined to be an image media file type, selects a second detection technique to apply when the type is determined to be an audio media file type, and selects a third detection technique to apply when the type is determined to be a video media file type.

Example 32 includes the apparatus of Example 28. The apparatus of Example 32 further includes means to select, based on the type, a first detection technique and a second detection technique from among a plurality of detection techniques. In Example 32, the means to apply the detection technique apply the first and second detection techniques to the media file to yield first and second detection results. The apparatus of Example 32 further includes means to compare a weighted combination of the first and second detection results to a threshold value, and means to identify the media file as containing steganographically hidden content based on the comparison of the weighted combination of the first and second detection results.

Example 33 includes the apparatus of any of Examples 28, 29, 30, and 31. In Example 33, the means to remediate the media file is to apply a remediation technique to the media file based on the type.

Example 34 includes the apparatus of any of Examples 28, 29, 30, and 31. In Example 34, the means to remediate the media file is to apply the remediation technique by modifying a least significant bit of bytes of data of the media file.

Example 35 includes the apparatus of any of Examples 28, 29, 30, and 31. The apparatus of Example 35 further includes means to enforce a set of policies when the media file is determined to include steganographically hidden content. The policies specify at least one of a remediation technique to be applied to the media file when steganographically hidden content is detected in the media file, and a reputation assigned to a media handler associated with the media file.

Example 36 includes the apparatus of any of Examples 28, 29, 30, and 31. The apparatus of Example 36 further includes means to assign a reputation to one or more media handlers based on a frequency at which media file types associated with the media handlers are determined to contain steganographically hidden content.

Example 37 is a machine readable medium including code, when executed, to cause a machine to perform the method of any of Examples 21-27.

Example 38 is a machine readable storage including machine-readable instructions. The machine-readable instructions, when executed, implement a method or realize an apparatus as described in any one of the preceding Examples.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to detect steganographically hidden content in a media file, the system comprising:
   a media classifier to determine a type of the media file;
   a selector to select, based on the type, a first detection technique and a second detection technique from among a plurality of steganographically based detection techniques;
   a detection technique applicator to apply the first and second detection techniques to the media file, the application of the first and second detection techniques to yield first and second detection results;
   a comparator to compare a combination of the first and second detection results to a threshold value;
   a file identifier to identify whether the media file as contains the steganographically hidden content based on the comparison of the combination of the first and second detection results to the threshold value: and
   a remediator to apply a remediation technique to the media file based on the steganographically hidden content being in the media file, at least one of the media classifier, the selector, the detection technique applicator, the comparator, the file identifier or the remediator implemented by at least one hardware circuit or at least one hardware processor.

2. The system of claim 1, wherein the media file is a first media file, and, further including a media interceptor to intercept a plurality of files transmitted on a data network, the plurality of files including a plurality of media files and a plurality of non-media files, the plurality of media files including the first media file.

3. The system of claim 1, further including a detector to apply a signature-based detection technique to determine whether the media file includes the steganographically hidden content.

4. The system of claim 1, wherein the remediator is to select the remediation technique to be applied to the media file based on the type.

5. The system of claim 1, wherein the remediator is to apply the remediation technique by modifying a least significant bit of bytes of data of the media file.

6. The system of claim 1, further including a policy enforcer to enforce a set of policies to be applied to the media file when the media file is determined to include the steganographically hidden content, the policies including a first policy specifying at least one of the remediation technique to be applied when the steganographically hidden content is detected in the media file, or a reputation assigned to a media handler associated with the media file.

7. The system of claim 1, further including a reputation assignor to assign a reputation to one or more media handlers based on a frequency at which media file types associated with the media handlers are determined to contain steganographically hidden content.

8. One or more non-transitory machine-readable storage media comprising machine-readable instructions that, when executed, cause one or more processors to at least:
   determine a media file type of a media file;
   select, based on the media file type, a first detection technique and a second detection technique from among a plurality of steganographically based detection techniques;
   apply the first and second detection techniques to the media file, the application of the first and second detection techniques to yield first and second detection results;
   compare a combination of the first and second detection results to a threshold value; and
   identify whether the media file contains steganographically hidden content based on the comparison of the combination of the first and second detection results to the threshold value; and
   apply a remediation technique to the media file in response to the media file including steganographically hidden content.

9. The one or more non-transitory machine-readable storage media of claim 8, wherein the instructions further cause the one or more processors to intercept a plurality of files on a data network, the plurality of files including media files and non-media files.

10. The one or more non-transitory machine-readable storage media of claim 8, wherein the instructions further cause the one or more processors to apply a signature-based detection technique to determine whether the media file includes steganographically hidden content.

11. The one or more non-transitory machine-readable storage media of claim 8, wherein the instructions further cause the one or more processors to select the remediation technique to be applied to the media file based on the media file type.

12. The one or more non-transitory machine-readable storage media of claim 8, wherein the instructions further cause the one or more processors to apply the remediation technique by modifying a least significant bit of bytes of data of the media file.

13. The one or more non-transitory machine-readable storage media of claim 8, wherein the instructions further cause the one or more processors to manage a set of policies to be applied to the media file when the media file is determined to include the steganographically hidden content, the policies including a first policy specifying at least one of the remediation technique to be applied when the steganographically hidden content is detected in the media file, or a reputation assigned to a media handler associated with the media file.

14. The one or more non-transitory machine-readable storage media of claim 8, wherein the instructions further cause the one or more processors to assign a reputation to one or more media handlers based on a frequency at which media file types associated with the media handlers are determined to contain steganographically hidden content.

15. The one or more non-transitory machine-readable storage media of claim 8, wherein the instructions further cause the one or more processors to determine, for a plurality of media file type formats, respective probabilities that media files having the respective media file type formats will contain steganographically hidden content.

16. A method to detect steganographically hidden content in a media file, the method comprising:
    determining a type of the media file;
    selecting, based on the type, a first detection technique and a second detection technique from among a plurality of steganographically based detection techniques;
    applying the first and second detection techniques to the media file, the application of the first and second detection techniques to yield first and second detection results;
    comparing a combination of the first and second detection results to a threshold value;
    identifying, by executing an instruction with at least one processor, whether the media file contains the steganographically hidden content based on the comparison of the combination of the first and second detection results to the threshold value; and
    applying, by executing an instruction with the at least one processor, a remediation technique to the media file in response to the media file including the steganographically hidden content.

17. The method of claim 16, further including applying a signature-based detection technique to determine whether the media file includes the steganographically hidden content.

18. The method of claim 16, further including selecting the remediation technique to be applied to the media file based on the type.

19. The method of claim 16, wherein the applying of the remediation technique includes modifying a least significant bit of bytes of data of the media file.

20. The method of claim 16, further including assigning a reputation to one or more media handlers based on a frequency at which media file types associated with the media handlers are determined to contain steganographically hidden content.

* * * * *